United States Patent
Fournier et al.

(10) Patent No.: US 11,248,674 B2
(45) Date of Patent: Feb. 15, 2022

(54) COIL SPRING AND METHOD OF FABRICATION THEREOF

(71) Applicant: RESSORTS LIBERTE INC., Montmagny (CA)

(72) Inventors: Rene Fournier, Levis (CA); Francois Masson, Quebec (CA); Luc Desjardins, Notre Dame des Prairies (CA); Germain Belanger, Saint-Germain de Grantham (CA)

(73) Assignee: RESSORTS LIBERTE INC., Montmagny (CA)

( * ) Notice: Subject to any disclaimer, the term of this patent is extended or adjusted under 35 U.S.C. 154(b) by 47 days.

(21) Appl. No.: 16/641,617

(22) PCT Filed: Aug. 16, 2018

(86) PCT No.: PCT/CA2018/050993
§ 371 (c)(1),
(2) Date: Feb. 24, 2020

(87) PCT Pub. No.: WO2019/036801
PCT Pub. Date: Feb. 28, 2019

(65) Prior Publication Data
US 2021/0156442 A1    May 27, 2021

Related U.S. Application Data

(60) Provisional application No. 62/549,602, filed on Aug. 24, 2017.

(51) Int. Cl.
*F16F 1/366*    (2006.01)
*B29C 70/24*    (2006.01)
(Continued)

(52) U.S. Cl.
CPC ............ *F16F 1/3665* (2013.01); *B29C 70/24* (2013.01); *B29C 70/70* (2013.01);
(Continued)

(58) Field of Classification Search
CPC ............ F16F 1/3665; F16F 2224/0241; F16F 2226/00; F16F 2228/007; F16F 2234/02;
(Continued)

(56) References Cited

U.S. PATENT DOCUMENTS

| | | | |
|---|---|---|---|
| 5,823,035 | A | 10/1998 | Albers et al. |
| 6,132,533 | A | 10/2000 | Cofrade et al. |

(Continued)

FOREIGN PATENT DOCUMENTS

| | | |
|---|---|---|
| CN | 101092014 A | 12/2007 |
| CN | 101786221 B | 7/2010 |

(Continued)

OTHER PUBLICATIONS

International Search Report and Written Opinion in respect of International Application No. PCT/CA2018/050993.

(Continued)

*Primary Examiner* — Robert A. Siconolfi
*Assistant Examiner* — San M Aung
(74) *Attorney, Agent, or Firm* — BCF LLP

(57) ABSTRACT

A composite spring made of a wire of a longitudinal axis curved around a spring axis in a winding direction and a method of fabrication thereof, the spring, the wire comprising a core; and fibers layers wound around the core, and an angular positioning, relative to the spring axis, of each one of the fiber layers being selected, along a length of the core, depending on the winding direction of the wire about the spring axis, to adjust at least one of: high natural frequency
(Continued)

of the spring, resistance to buckling and resistance to tensile and compressive stress components induced by a compressive load on the spring.

20 Claims, 25 Drawing Sheets

(51) Int. Cl.
  *B29C 70/70* (2006.01)
  *B29L 31/00* (2006.01)
(52) U.S. Cl.
  CPC ............... *B29L 2031/7742* (2013.01); *F16F 2224/0241* (2013.01); *F16F 2226/00* (2013.01); *F16F 2228/007* (2013.01); *F16F 2234/02* (2013.01); *F16F 2238/028* (2013.01)
(58) Field of Classification Search
  CPC .... F16F 2238/028; B29C 70/24; B29C 70/70; B29C 53/12; B29C 53/38; B29L 2031/7742
  USPC .................. 267/166, 169, 155, 158
  See application file for complete search history.

(56) References Cited

U.S. PATENT DOCUMENTS

| | | | |
|---|---|---|---|
| 7,857,294 B2 | 12/2010 | Spencer et al. | |
| 8,857,801 B2 | 10/2014 | Yoshioka | |
| 2002/0190451 A1* | 12/2002 | Sancaktar | B29C 70/542 267/166 |
| 2005/0258928 A1* | 11/2005 | Hase | H01H 37/74 337/14 |
| 2009/0243174 A1* | 10/2009 | Spencer | B29C 70/32 267/169 |
| 2014/0015179 A1 | 1/2014 | Cunha et al. | |
| 2015/0033838 A1* | 2/2015 | Chabanon | G01G 19/08 73/117.03 |
| 2016/0025173 A1* | 1/2016 | Wagner | F16F 3/12 267/273 |
| 2017/0108072 A1 | 4/2017 | Takikawa et al. | |
| 2017/0108658 A1* | 4/2017 | Kondo | G02B 6/4432 |
| 2017/0122395 A1 | 5/2017 | Kiele et al. | |

FOREIGN PATENT DOCUMENTS

| | | |
|---|---|---|
| CN | 201714881 U | 1/2011 |
| CN | 201818683 U | 5/2011 |
| CN | 102501009 A | 6/2012 |
| CN | 102699239 A | 10/2012 |
| CN | 102699242 B | 10/2012 |
| CN | 202555729 U | 11/2012 |
| CN | 103121069 B | 5/2013 |
| CN | 103567716 B | 2/2014 |
| CN | 203532601 U | 4/2014 |
| CN | 203955972 U | 11/2014 |
| CN | 104190829 A | 12/2014 |
| CN | 104190829 B | 12/2014 |
| CN | 204025474 U | 12/2014 |
| CN | 205533923 U | 8/2016 |
| CN | 107309377 A | 11/2017 |
| CN | 107838329 A1 | 3/2018 |
| DE | 102011078543 A1 | 1/2013 |
| EP | 0637700 A2 | 2/1995 |
| EP | 0584468 B1 | 12/1995 |
| EP | 0584474 B1 | 2/1997 |
| EP | 1120580 B2 | 8/2001 |
| EP | 0830462 B1 | 2/2002 |
| EP | 1533053 B1 | 9/2006 |
| EP | 2781279 B1 | 9/2014 |
| JP | H08224632 A | 9/1996 |
| JP | 2000129359 A | 5/2000 |
| JP | 2003300256 A | 10/2003 |
| JP | 2007268573 A | 10/2007 |
| JP | 2014223656 A | 12/2014 |
| JP | 2014231069 A | 12/2014 |
| JP | 5855600 B2 | 2/2016 |
| JP | 201655162 A | 9/2016 |
| JP | 6113891 B1 | 11/2017 |
| KR | 20170037442 A | 4/2017 |
| WO | 2014008466 A2 | 1/2014 |
| WO | 2016034319 A1 | 3/2016 |
| WO | 2016136419 A1 | 9/2016 |
| WO | 2017204074 A1 | 11/2017 |

OTHER PUBLICATIONS

Supplementary European Search Report, Application No. EP 18 84 7968, dated Mar. 30, 2021.

* cited by examiner

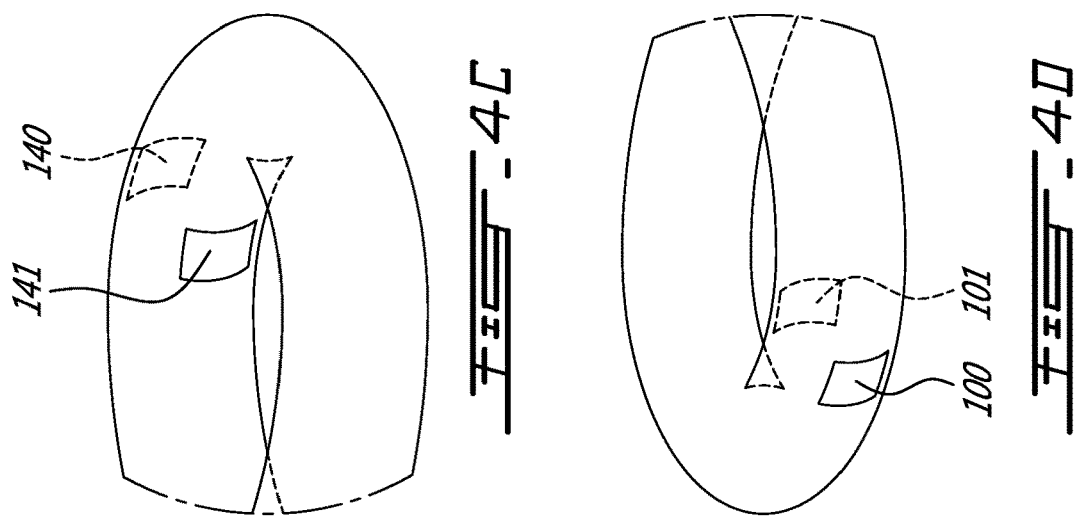
FIG. 4C
FIG. 4D
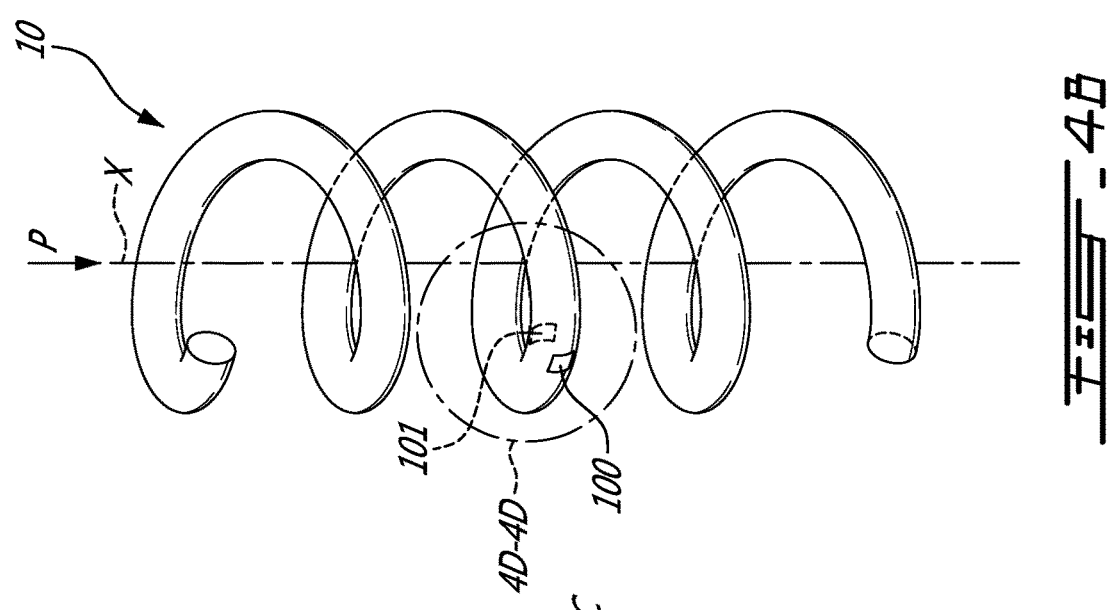
FIG. 4B
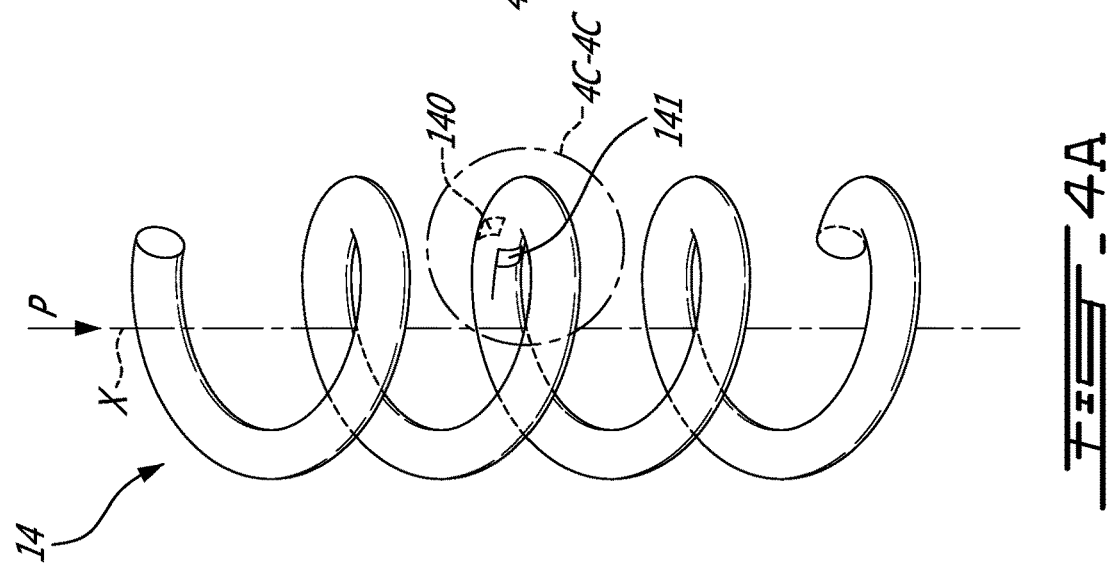
FIG. 4A

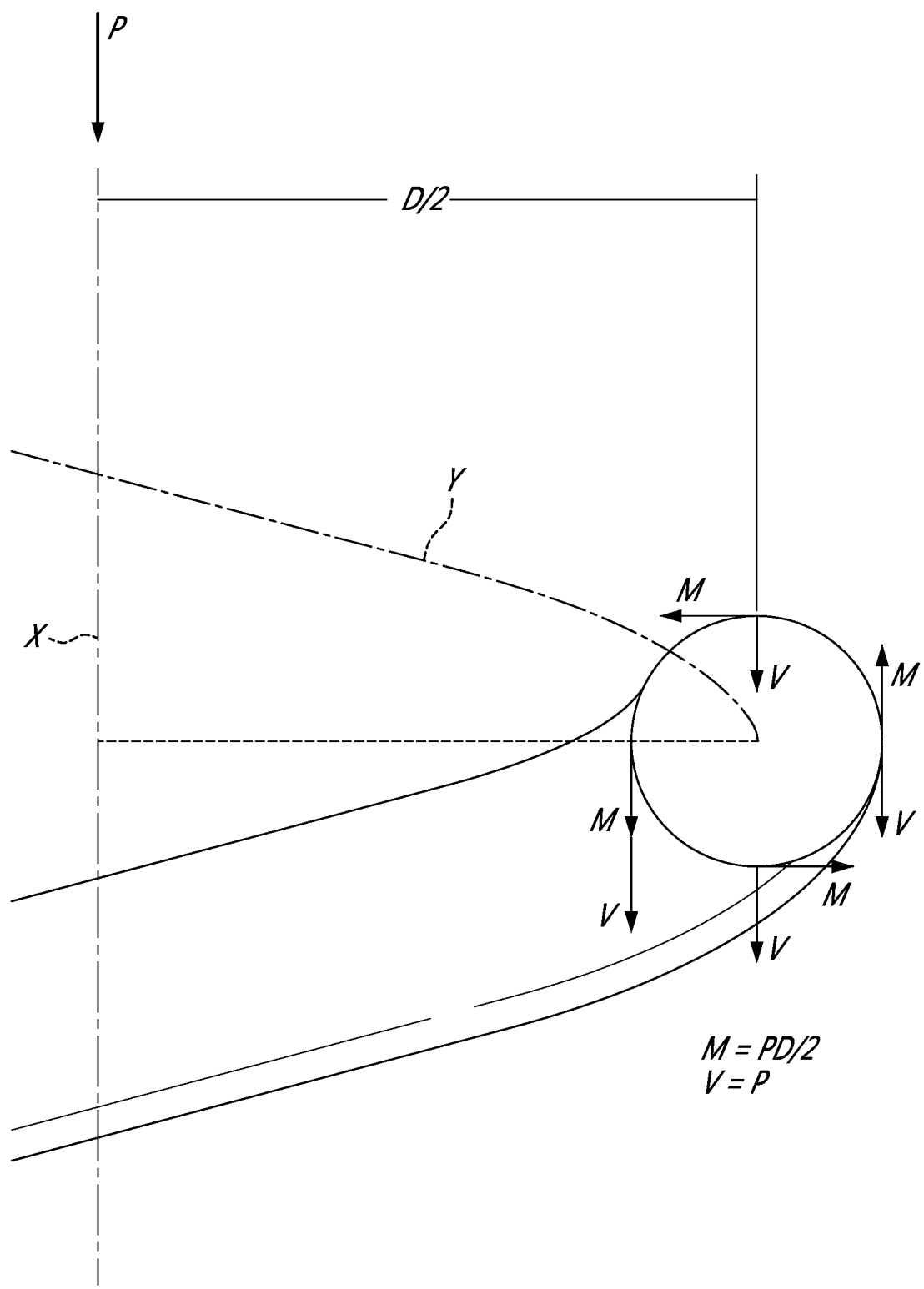

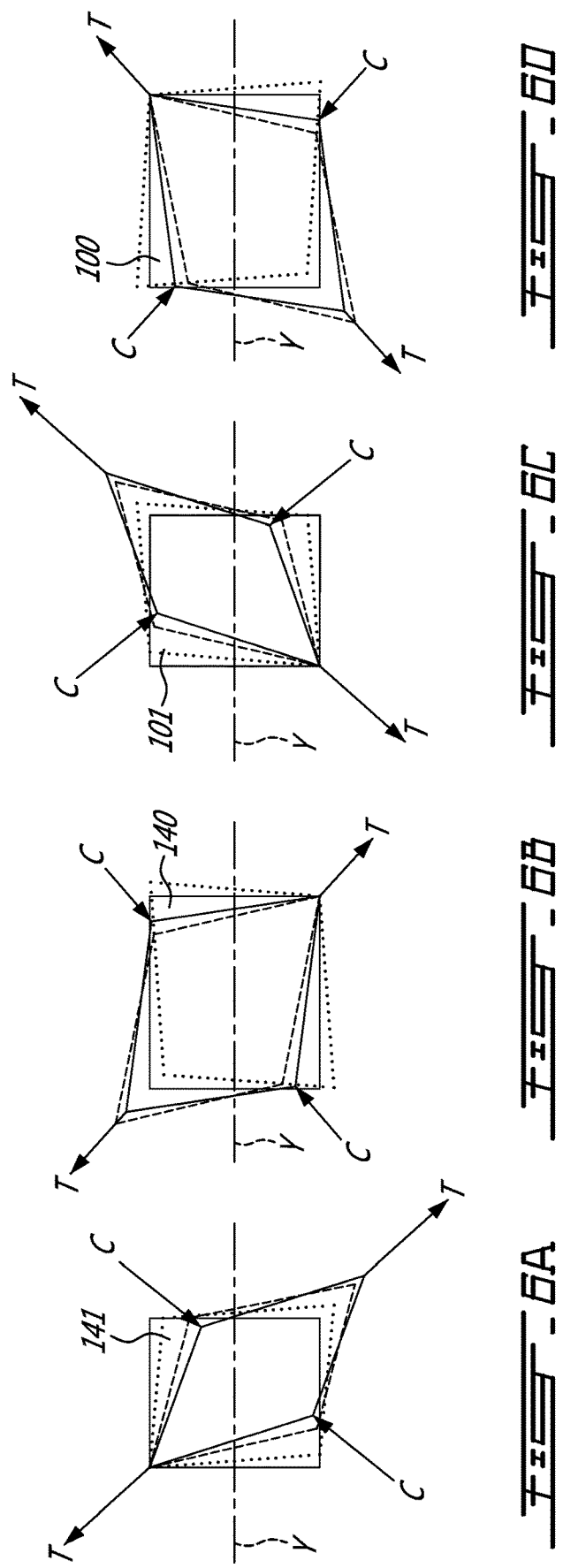

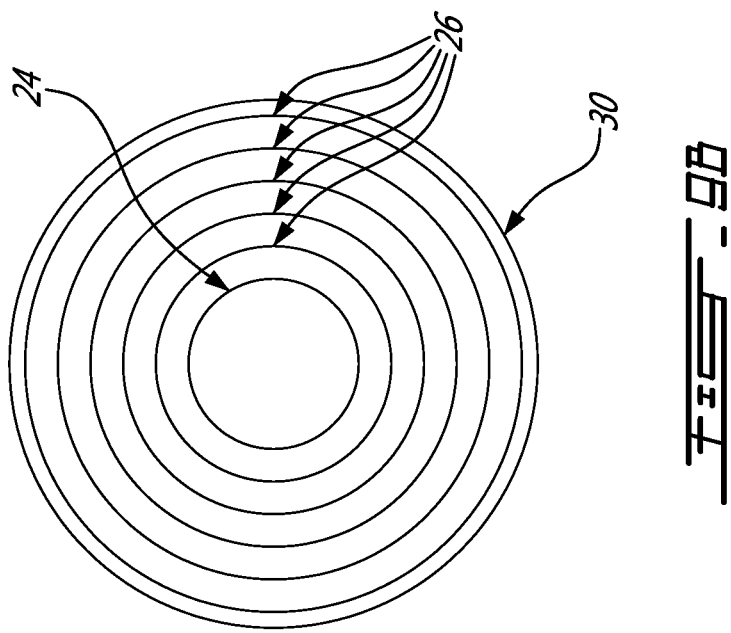
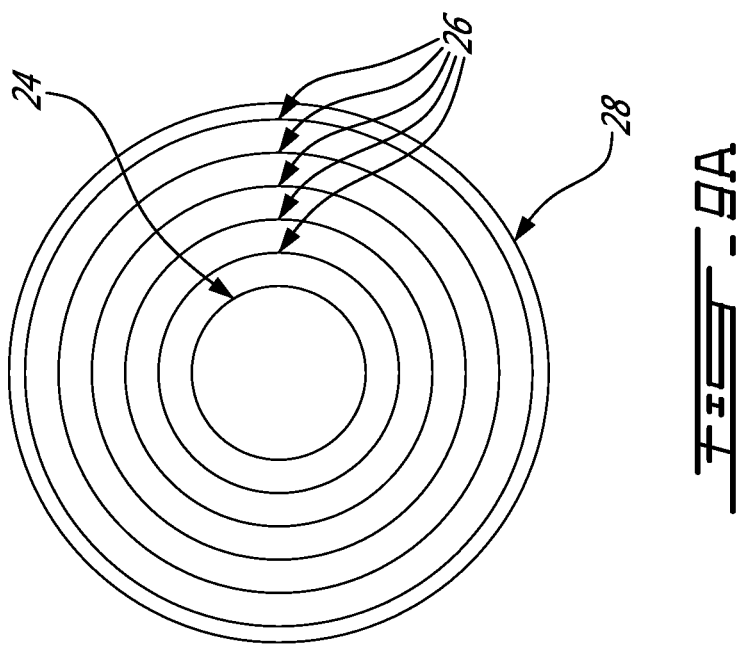

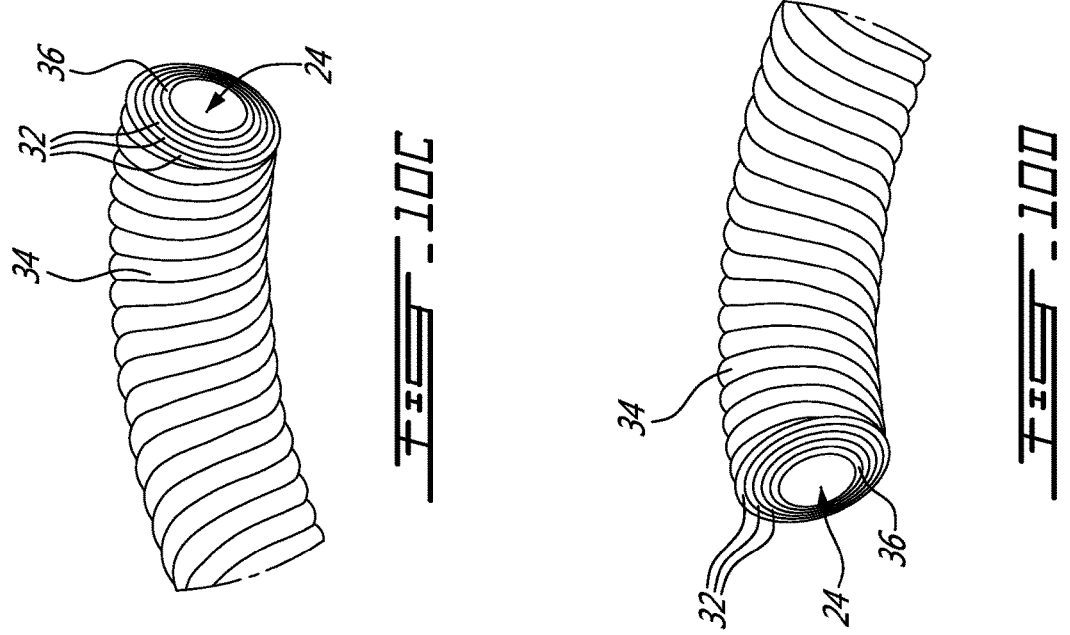
FIG-10C
FIG-10D
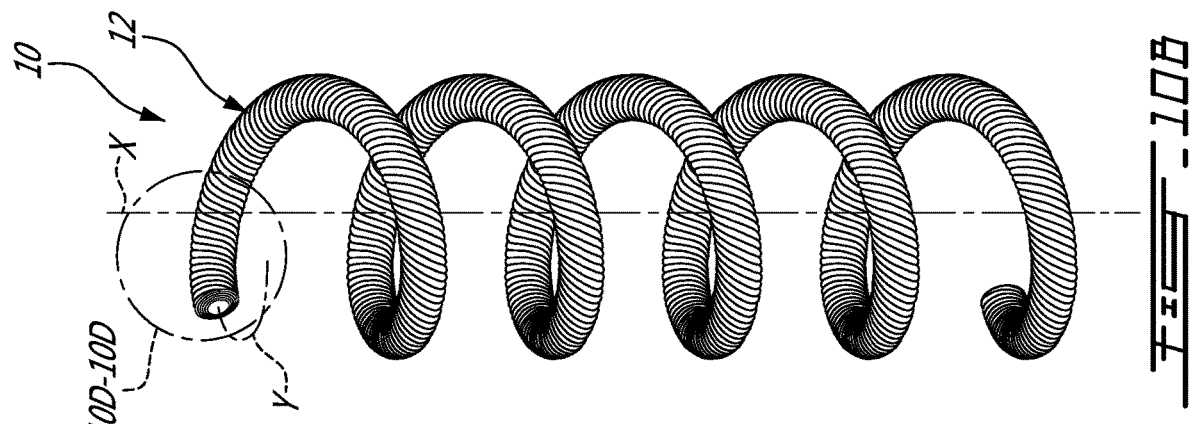
FIG-10B
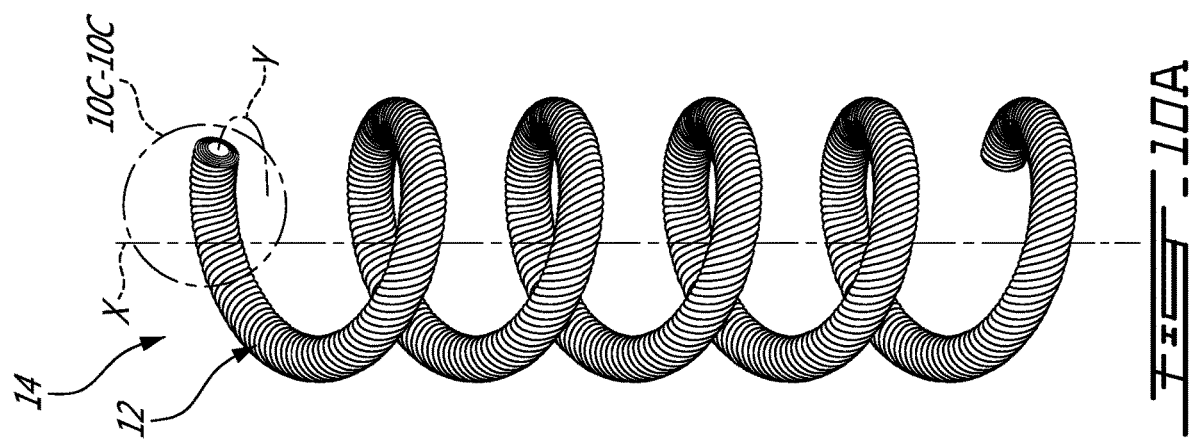
FIG-10A

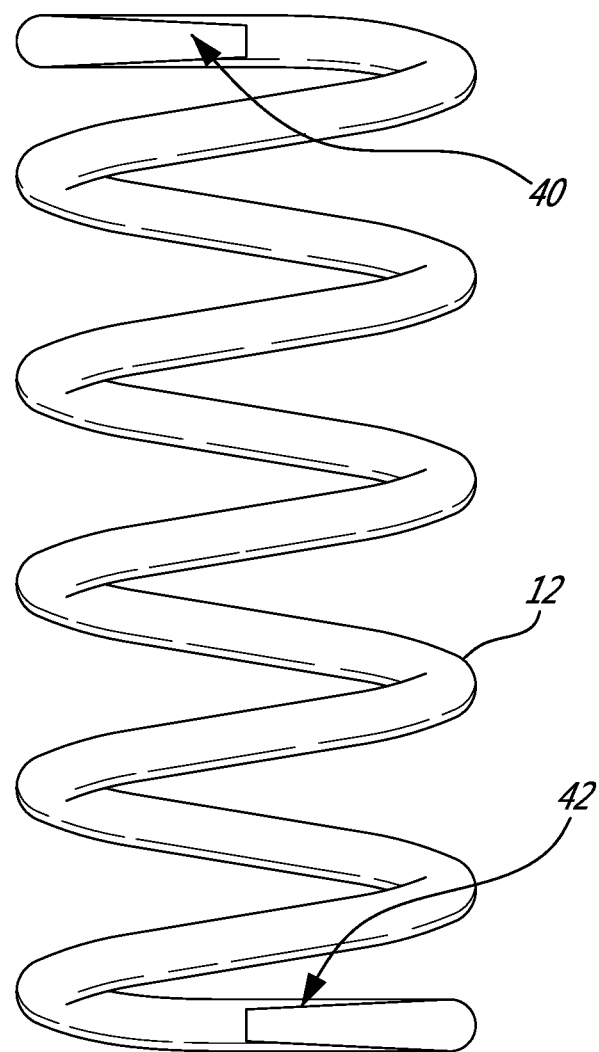

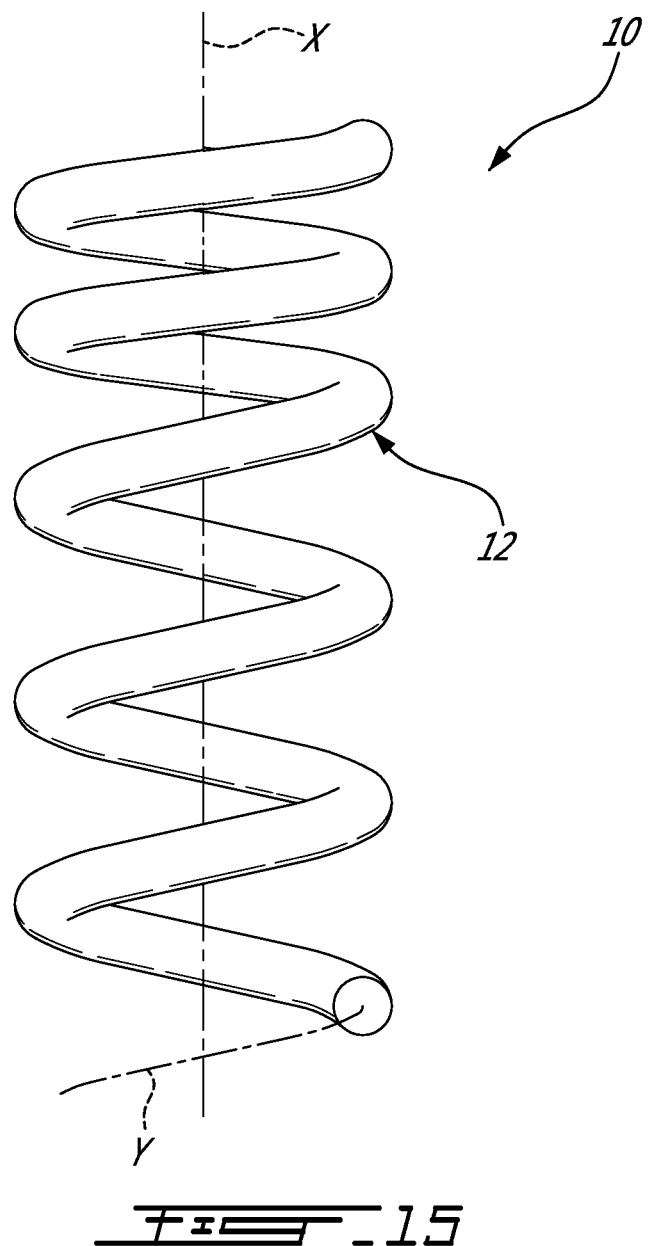

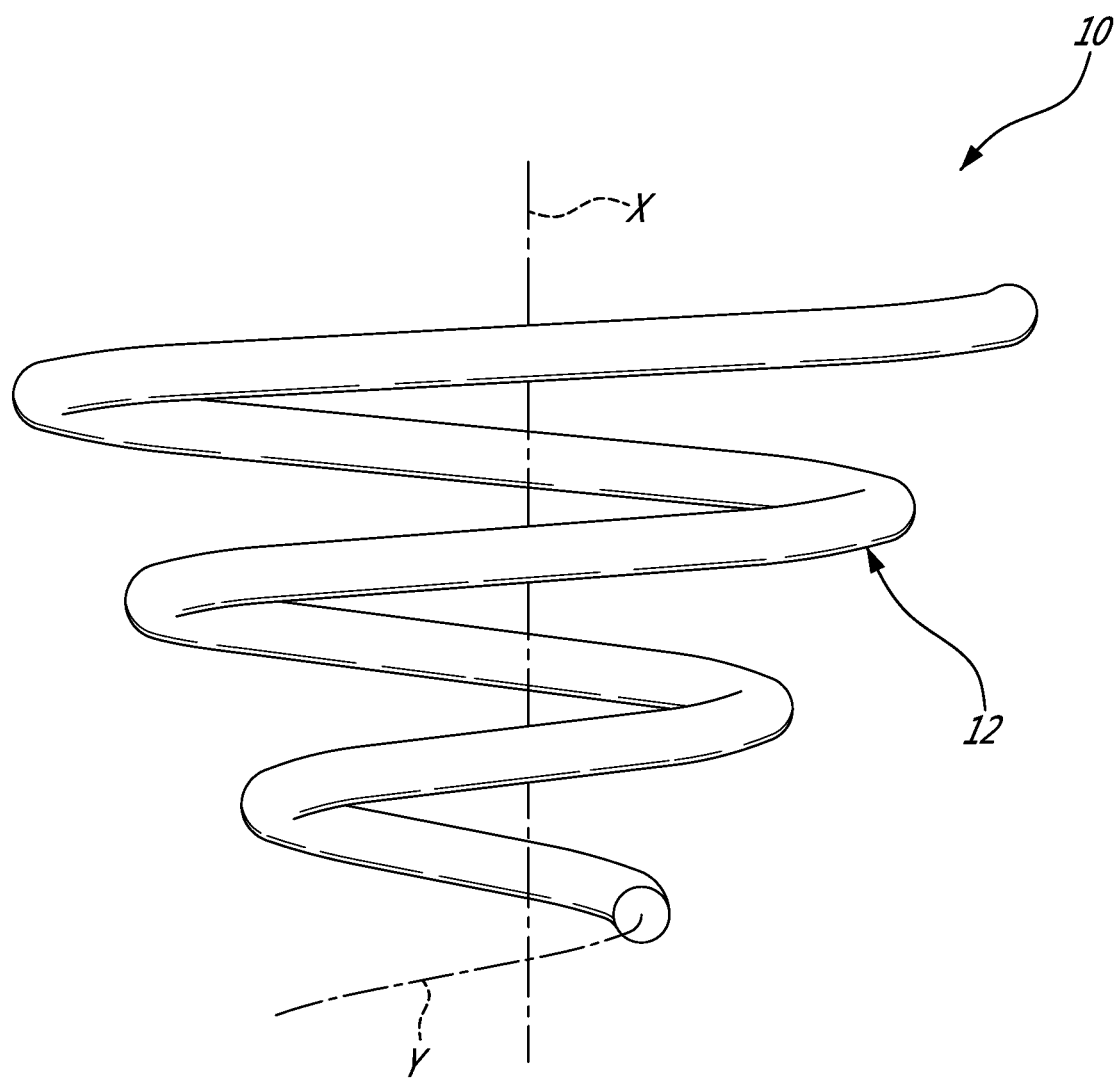

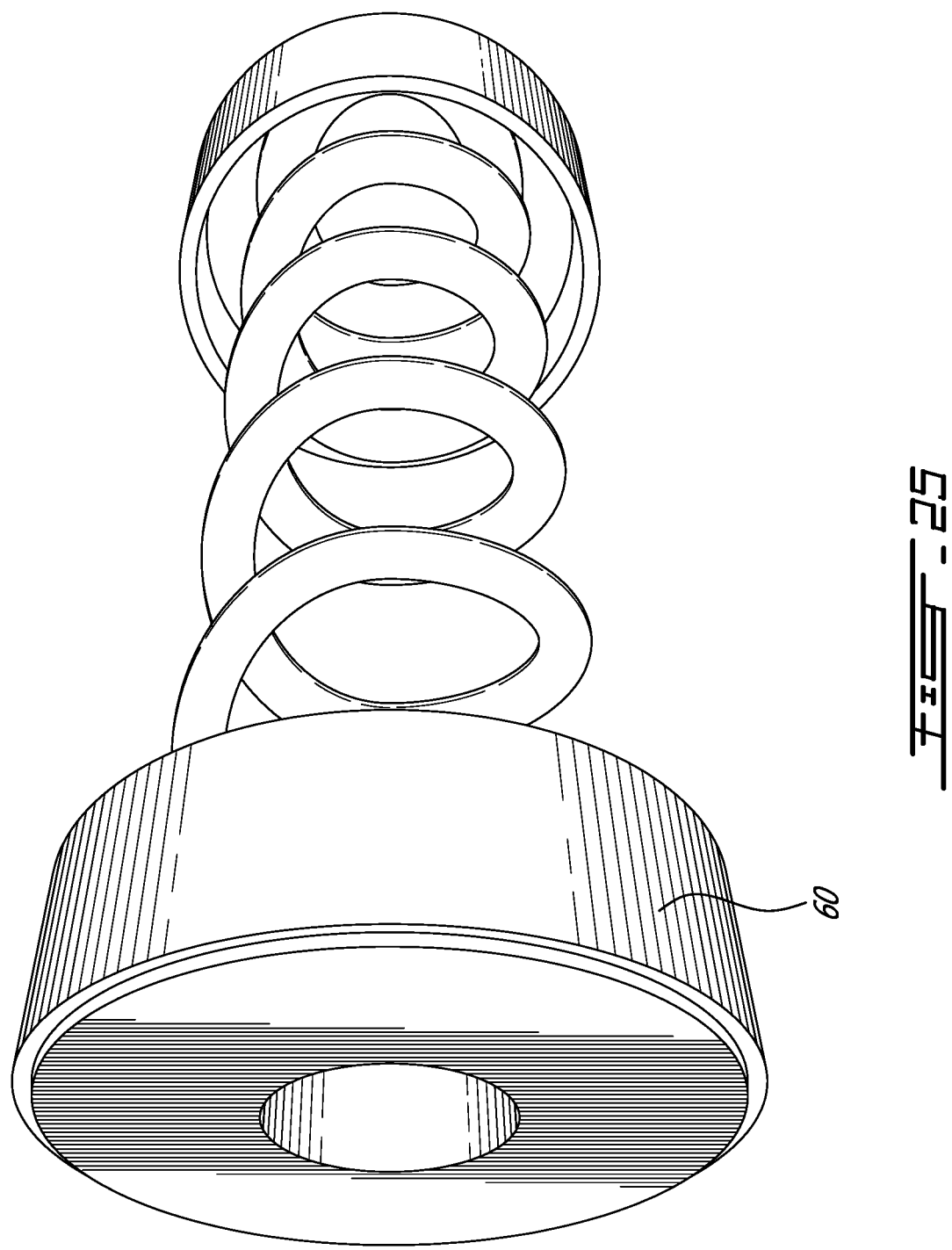

COIL SPRING AND METHOD OF FABRICATION THEREOF

CROSS-REFERENCE TO RELATED APPLICATIONS

This application is a National Entry Application of PCT application no PCT/CA2018/050993 filed on Aug. 16, 2018 and published in English under PCT Article 21(2), which itself claims benefit of U.S. provisional application Ser. No. 62/549,602, filed on Aug. 24, 2017. All documents above are incorporated herein in their entirety by reference.

FIELD OF THE INVENTION

The present invention relates to coil springs. More particularly, it relates to composite coil springs and a method of fabrication thereof.

BACKGROUND OF THE INVENTION

Springs are typically used to store, and subsequently release, energy, to absorb shock, or to maintain a force between contacting surfaces. They deform under an applied load and return to their natural length when unloaded. There is a wide range of springs, including compression coil springs designed to resist being compressed, tension/extension coil springs designed to resist stretching, torsion coil springs designed to resist twisting actions, leaf springs commonly used for the suspension in wheeled vehicles, conical spiral springs, Belleville springs etc.

When used in the automotive industry, springs are commonly made of steel and designed to meet target mechanical stress and fatigue characteristics. Efforts are directed to reducing the weight of the springs while increasing resistance to fatigue or maximum loads, by selecting the material of the springs, the geometry of the wire used and/or of the spring, the manufacturing method etc.

Composite materials have recently increasingly been used in the automotive industry, for example in relation to leaf springs and drive shafts.

There is still a need in the art for a coil spring and a method of fabrication thereof.

SUMMARY OF THE DISCLOSURE

More specifically, in accordance with the present disclosure, there is provided a composite spring made of a wire of a longitudinal axis curved around a spring axis in a winding direction, the wire comprising a core; and fibers layers wound around the core; wherein an angular positioning, relative to the spring axis, of each one of the fiber layers being selected, along a length of the core, depending on the winding direction of the wire about the spring axis, to adjust at least one of: high natural frequency of the spring, resistance to buckling and resistance to tensile and compressive stress components induced by a compressive load on the spring.

There is further provided a method for fabricating a composite spring, comprising fabricating a composite uncured preform comprising a core and at least two fiber layers; selectively shaping the uncured preform into a spring; and curing.

Other objects, advantages and features of the present disclosure will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 4A is a schematic view of a compression coil spring with a left winding direction under a compressive load;

FIG. 4B is a schematic view of the compression coil spring with a right winding direction under a compressive load;

FIG. 4C is a detail of FIG. 4A;

FIG. 4D is a detail of FIG. 4B;

FIG. 5 is a diagrammatic view of torsional moment and direct shear on a wire;

FIG. 6A is a diagrammatic view of effect, on an inner surface of the coil spring, of a compressive load on a compression coil spring with left winding direction;

FIG. 6B is a diagrammatic view of effect, on an outer surface of the coil spring, of a compressive load on a compression coil spring with left winding direction;

FIG. 6C is a diagrammatic view of effect, on an inner surface of the coil spring, of a compressive load on a compression coil spring with right winding direction;

FIG. 6D is a diagrammatic view of effect, on an outer surface of the coil spring, of a compressive load on a compression coil spring with right winding direction;

FIG. 9A is a cross section of FIG. 8 along line A-A according to an embodiment of an aspect of the present disclosure;

FIG. 9B is a cross section of FIG. 8 along line A-A, according to another embodiment of an aspect of the present disclosure;

FIG. 10A shows a left winding compression coil spring according to an embodiment of an aspect of the present disclosure;

FIG. 10B shows a right winding compression coil spring according to an embodiment of an aspect of the present disclosure;

FIG. 10C is a detail of the wire of the coil spring of FIG. 10A;

FIG. 10D is a detail of the wire of the coil spring of FIG. 10B;

FIG. 11 is a schematic view of a compression coil spring with a right winding direction, with tapered terminal ends, according to an embodiment of an aspect of the present disclosure;

FIG. 15 shows a variable pitch cylindrical coil spring according to embodiment of an aspect of the present disclosure;

FIG. 16 shows a conical coil spring according to embodiment of an aspect of the present disclosure;

FIG. 25 shows a step of a method for making the plate geometry shown in FIG. 24.

DESCRIPTION OF ILLUSTRATIVE EMBODIMENTS

The present invention is illustrated in further details by the following non-limiting examples.

A coil spring typically comprises a wire of a longitudinal axis (Y), which is shaped, by winding around an axis (X), into a coil of longitudinal axis (X).

Figure 1:
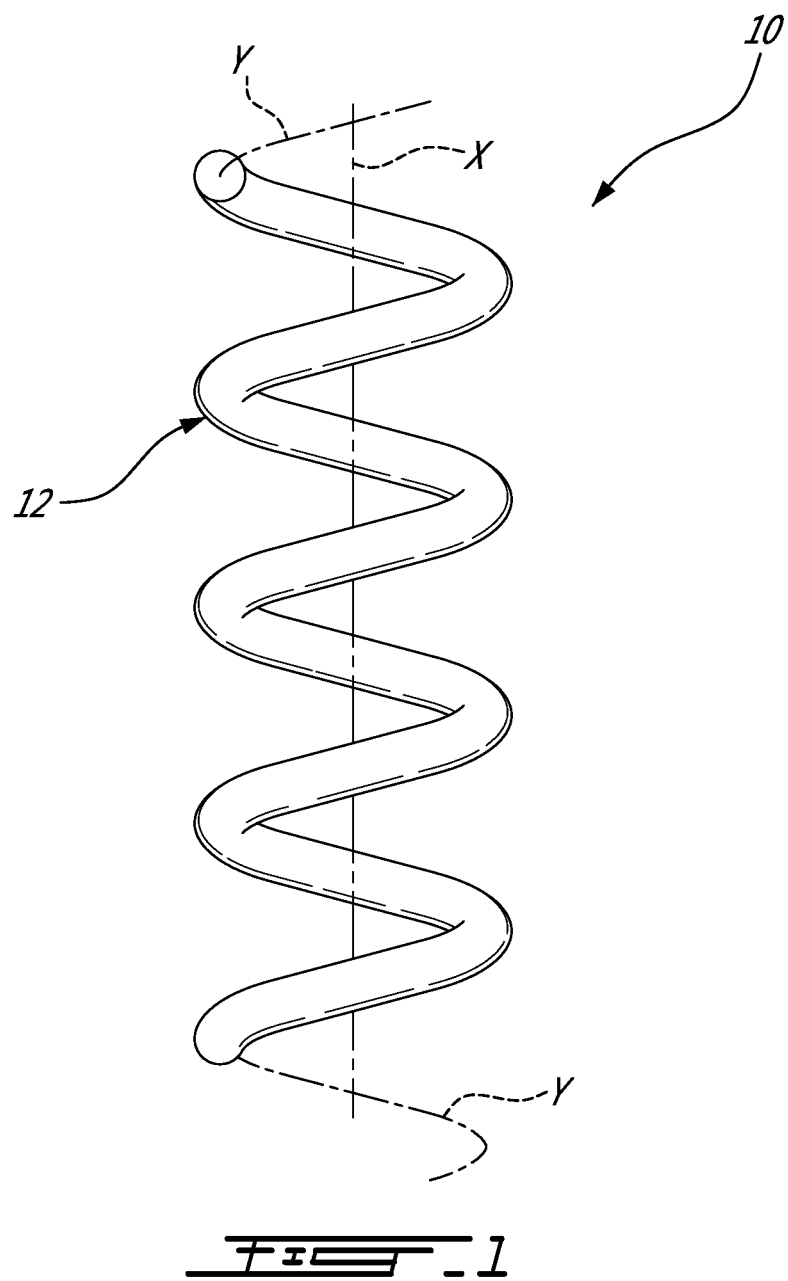
FIG. 1 is a schematic view of a compression coil spring with a right winding direction.

FIG. 1 shows a wire 12 of longitudinal axis (Y) made to curve around the axis (X) in the counter-clockwise direction, into a compression coil spring 10 having a right winding direction.

Figure 2:
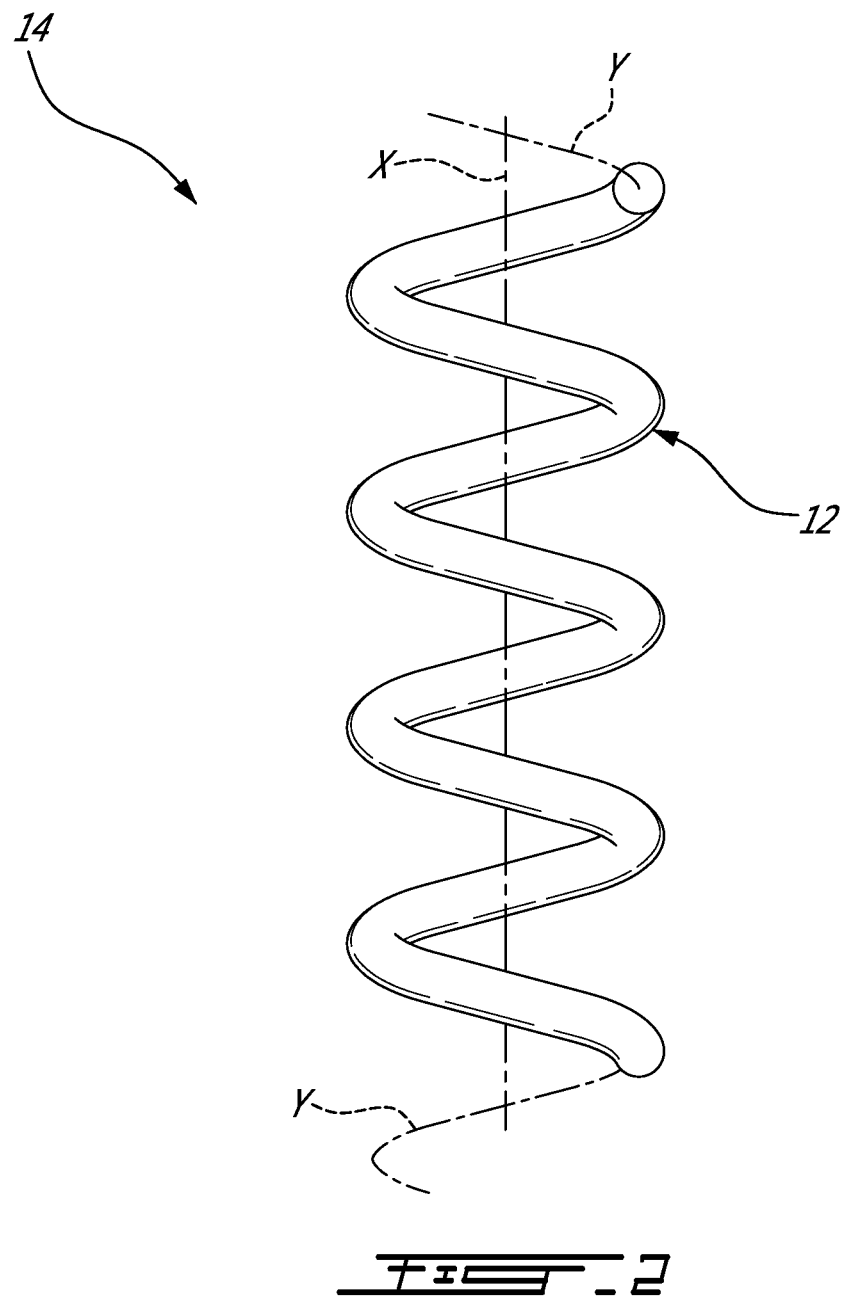
FIG. 2 is a schematic view of a compression coil spring with a left winding direction.

FIG. 2 shows a wire 12 made to curve around the axis (X) in the clockwise direction, into a compression coil spring 14 with a left winding direction.

Figure 3:
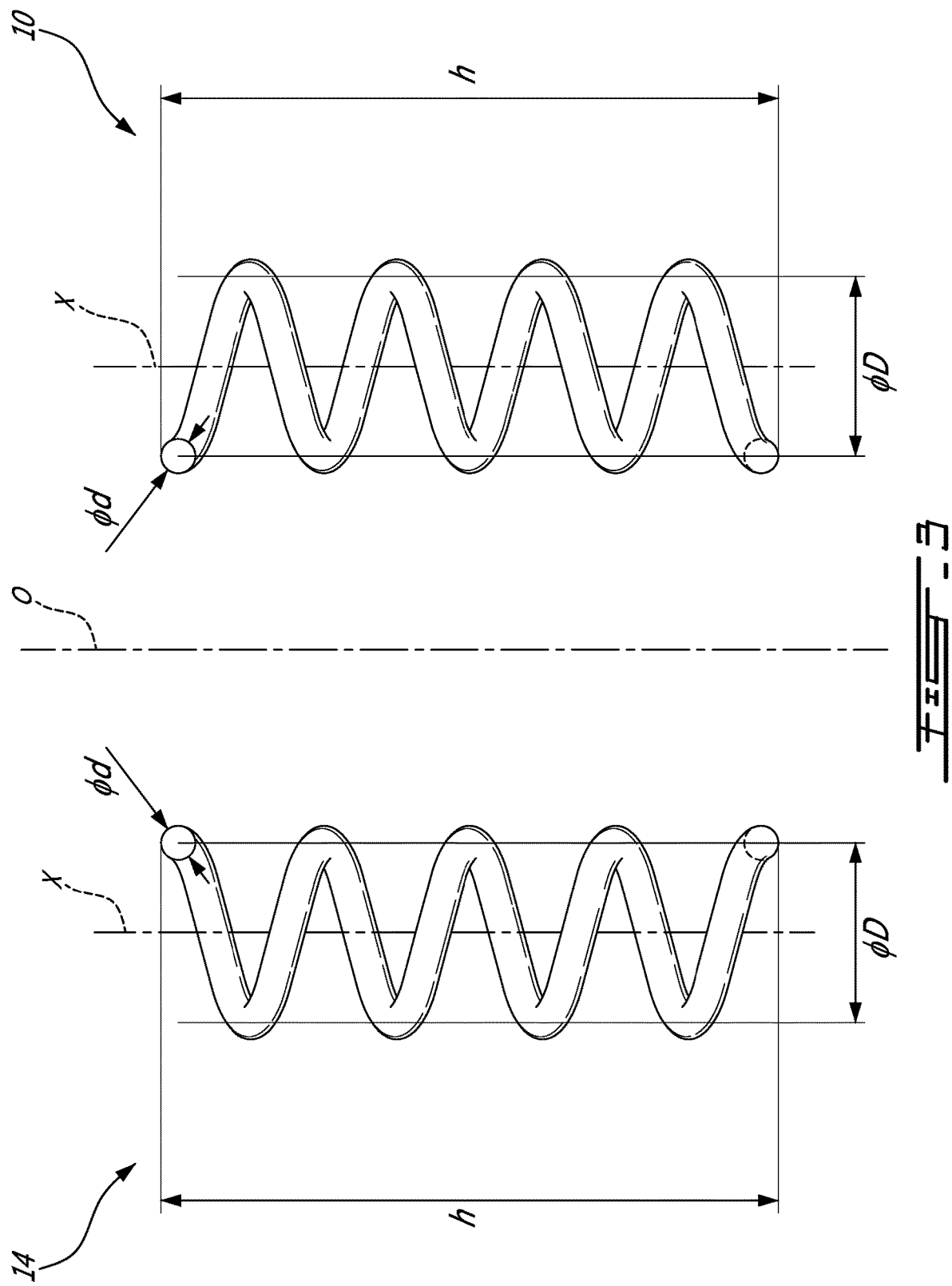
FIG. 3 shows chirality between similar coil springs with right and left winding directions.

As illustrated in FIG. 3, the springs 10 and 14, which comprise the same number of turns of the wire 12 around the axis (X), the same spring mean diameter ($\Phi D$), the same wire cross section diameter ($\Phi d$) and the same spring free height (h), are chiral objects: they are distinguishable from their mirror image relative to a plane (O) and they cannot be superposed onto it, due to their different winding directions.

FIG. 4 show the springs 10 (FIG. 4B) and 14 (FIG. 4A) under application of a same compressive load P along their respective axis (X). Parallelepiped elements 140, 141 and 100, 101 are pointed out at the surface of the springs to follow the deformation and associated stresses resulting from the compressive load P submitted to the springs. Elements 101 on the surface of the wire 12 of the spring 10 and element 141 on the surface of the wire 12 of the spring 14 are positioned close to the axis (X), i.e. on the inner side of the springs 10 and 14 respectively, while element 100 on the surface of the wire 12 of the spring 10 and element 140 on the surface of the wire 12 of the spring 14 are positioned away from the axis (X), i.e. on the outer side of the springs 10 and 14 respectively, as best seen in FIGS. 4C and 4D.

FIG. 6 show the deformation of the elements 140, 141 and 100, 101 of FIG. 4 due to the application of the load P on the compression springs 10 and 14. The applied load P generates a torsional moment M, as well as a direct shear force V, on the wire section.

As illustrated in FIG. 5, the torsional moment, defined as $M=P \times \Phi D/2$, causes a deformation on the circumference of the wire section along a tangential direction relative to the surface of the wire. The direct shear force V causes a deformation along the direction of the applied load P, i.e. along the axis (X) of the spring. Thus, on the inner side of the spring, the two deformations have a same direction, while they have opposite direction on the on the outer side of the spring.

Thus, these two components cause shear stresses that deform the elements 140, 141 and 100, 101 in a way that their sides are no longer perpendicular, as shown by the dotted (direct shear force) and dashed (torsional moment) lines in FIG. 6.

It can be seen that their effects are additive at the inner side of the springs (as exemplified by 101 and 141 for example) while they are subtracted at the outer side of the springs (as exemplified by 100 and 140 for example). The overall net effect is represented in FIG. 6 by bold solid lines.

As clearly seen in FIG. 6 by comparing inner elements 101 and 141 and outer elements 100 and 140 for example, there is a relationship between the winding direction of the spring and the orientation of the shear stresses acting on the material elements in regards with the longitudinal axis (Y) of the wire 12. These shear stresses can also relate to tensile and compressive stress components along the diagonals of the elements, respectively noted T and C in FIG. 6. Again there is a direct relationship between the winding direction of the spring and the direction in regard with the longitudinal axis (Y) of the tensile and compressive stress components.

The index of the spring, defined by the ratio of the spring mean diameter ($\Phi D$) over the wire diameter ($\Phi d$) as $c=\Phi D/\Phi d$, also impacts the length of the infinitesimal material elements depending on their position on the wire, which also determines the shear stresses caused on the wire section under loading. The lower the ratio c, i.e. the larger the diameter $\Phi d$ of the wire, the larger the distances between the inner side ($\Phi D/2 - \Phi d/2$) and the outer side (($\Phi D/2 + \Phi d/2$) respectively, and the (X) axis of the spring. Under a torsional moment, the wire thus deforms according to a relative rotation of the sections thereof, in a different way: since the inner circumference of the wire is shorter the effect (shear stresses) increases towards the inner side of the springs (as exemplified by 101 and 141 for example).

Thus, torsional moment, direct shear and curvature combine and yield a shear stress distribution over the periphery of the wire cross section. The shear stress may be larger by up to 30% on the inner side of the spring compared to on the outer side of the spring in the case of a spring with an index of about 10. In case of an index of 6 and lower, this effect may be even higher. Maximum shear stress always occurs at the inner side of the springs. Hence, failure of the springs, in the form of cracks in the wire, generally initiates from the inner side of the spring.

Due to this non-uniform stress distribution over an axisymmetric cross section of the spring wire as discussed hereinabove, generally the energy storing and releasing capacity of a spring with spring wires having an axisymmetric section are limited by the more solicited locations on the wires, while the remaining portions of the spring are underused.

Figure 7:
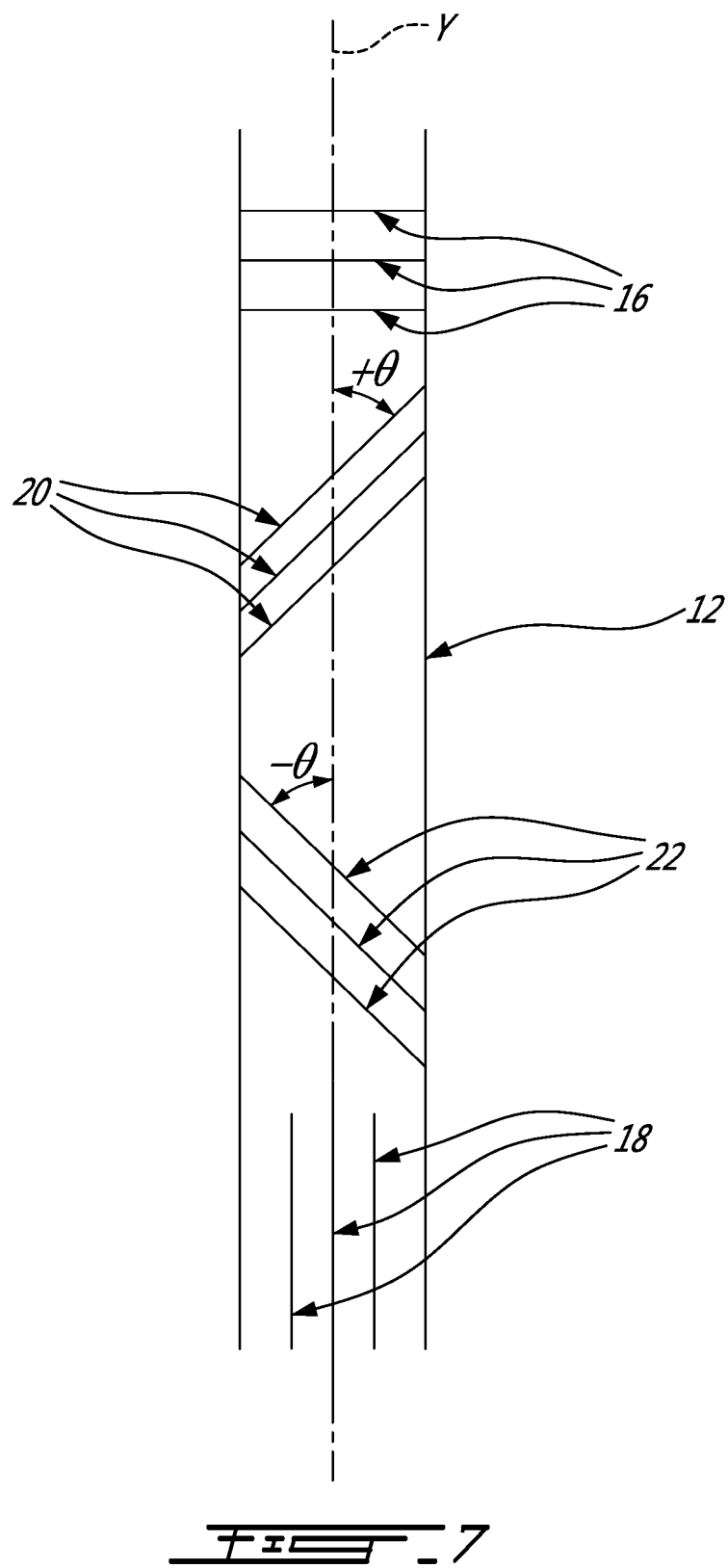
FIG. 7 shows angular positioning of fibers of a preform of a spring according to an embodiment of an aspect of the present disclosure.

FIG. 7 illustrates angular positioning of fibers within a composite wire 12, relative to the longitudinal axis (Y) of the wire 12. Fibers 16 are oriented at 90° relative to the axis (Y), fibers 18 are oriented at 0° relative to the axis (Y), fibers 20 are oriented at +θ° relative to the axis (Y) and 22 are oriented at −θ° relative to the axis (Y).

Figure 8:
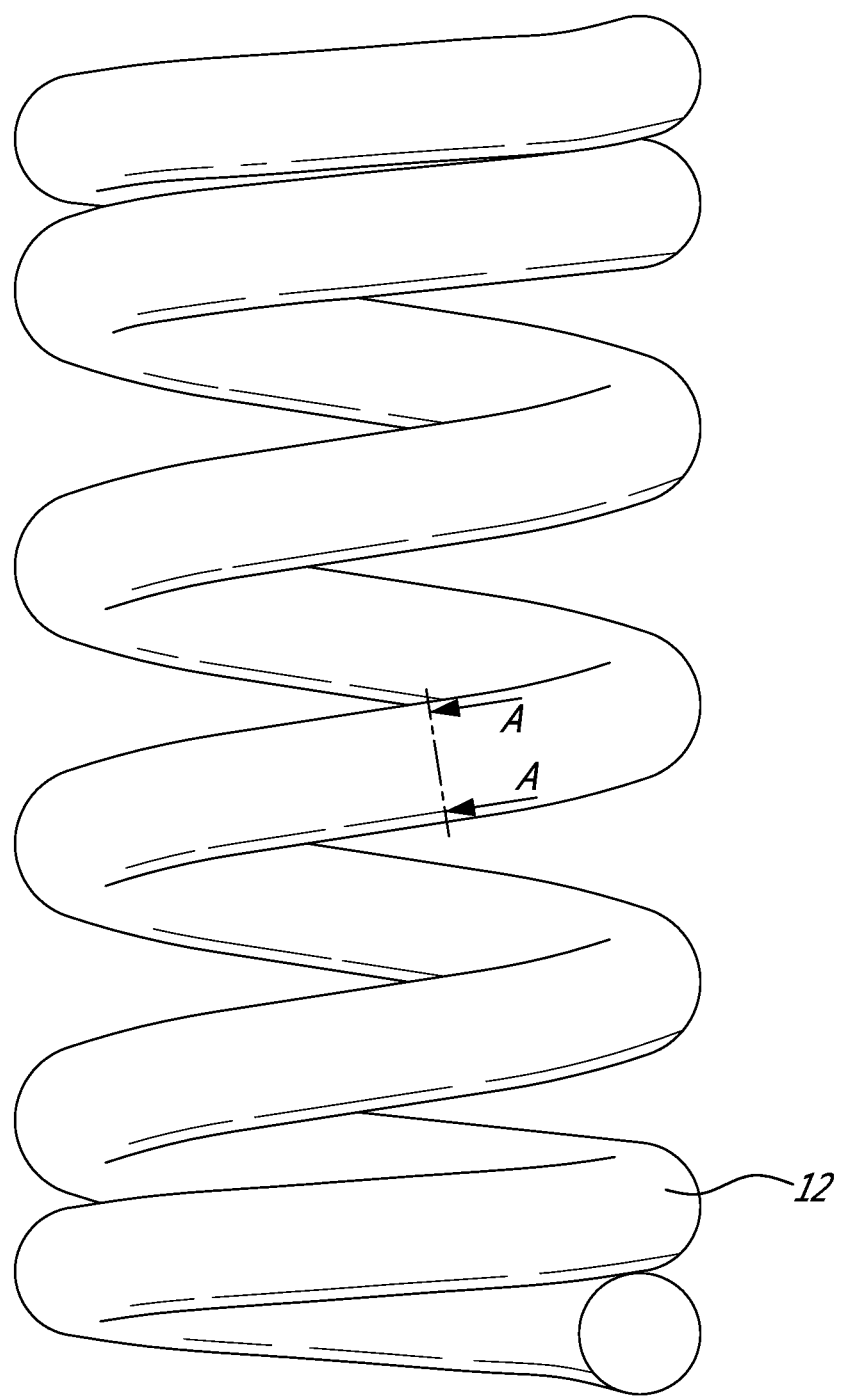
FIG. 8 is a schematic view of a closed-end compression coil spring with a right winding direction.

FIG. 8 shows a closed-end compression coil spring with a right winding direction. As shown in cross sections along line A-A of FIG. 8 in FIG. 9, the spring of FIG. 8 comprises a wire 12 comprising a core 24 and several layers 26 of fibers wound around the core 24. The fibers of the layers 26 may be glass fibers, carbon fibers or a combination thereof, and they may be embedded in a resin such as polyester, epoxy or urethane for example. The core 24 with the surrounding fibers layers 26 may be embedded in a heat-shrink tube 28 (see FIG. 9A) or wrapped in a shrink tape 30 (see FIG. 9B) or a coextruded flexible thermoplastic sheath or covered by a sprayed plastic film for example.

According to an embodiment of an aspect of the present disclosure, the angular positioning of the fibers within the wire of the spring, i.e. the orientation angle of the fibers relative to the direction (Y) of the wire coiled into the spring, and the sequence of the fibers starting from the fiber closest to the center of the section of the wire to the fiber the most remote therefrom, are selected depending on the direction of winding.

FIGS. 10C and 10D show wires comprising a core 24 and a symmetrical stacking sequence of composite lamina comprising an outermost layer 34, located on the outer surface of the wire, intermediate layers 32 and innermost layer 36, located between the intermediate layers and the core 24, made of fibers impregnated in resin; for a given layer, an angular positioning of the fibers relative to the axis (Y) is selected and the layer is wound accordingly relative to the core 24 of the wire 12.

In a right winding spring (FIG. 10B), the stacking sequence may be balanced, i.e. with a same number of layers or a same quantity of fibers oriented at +θ° than at −θ° relative to the axis (Y) of the spring wire; or the stacking sequence may be unbalanced, with a higher number of layers or higher quantity of fibers oriented at −θ° than oriented at +θ° relative to the axis (Y) of the spring wire (see FIGS. 10B, 10D).

In a left winding spring (FIG. 10A), the stacking sequence may be balanced, i.e. with a same number of layers or a same quantity of fibers oriented at +θ° than at −θ° relative to the axis (Y) of the spring wire; or unbalanced, i.e. with a higher number of layers or higher quantity of fibers oriented at +θ° than at −θ° relative to the axis (Y) of the spring wire (see FIGS. 10A, 10C).

The angular positioning of the fibers, i.e. the orientation angle of the fibers relative to the axis (Y) of the spring wire, is selected depending on the direction of the spring winding direction about the spring axis (X), according to target characteristics of the spring including: high natural frequency of the spring, resistance to buckling of the spring, and resistance to tensile and compressive stress components induced by application of a compressive load on the spring. Thus, the angular layout of the fibers in a compression coil spring with a right winding or with a left winding direction may be as follows:

innermost layers 36 are oriented at an angle in a range between about +75° and about +90° or in a range between about −75° and about −90°, relative to the axis (Y) of the spring wire, to increase the high natural frequency of the spring, independently of the winding direction; and/or innermost layers 36 are oriented at an angle in a range between about 0° and about +15°, or between about 0° and about −15°, relative to the axis (Y) of the spring wire, to increase resistance to buckling of the spring, independently of the winding direction;

intermediate layers 32 are oriented at an angle in a range between about +35° and about +55° or in a range between about −35° and about −55° relative to the axis (Y) of the spring wire, to increase resistance to tensile and compressive stress components induced by application of a compressive load on the spring (see FIGS. 10C, 10D);

in a left winding direction, the outermost layer 34 is oriented at an angle in a range between about +35° and about +55° relative to the axis (Y) of the spring wire, to increase resistance to tensile stress components (see FIGS. 10A, 10C)

in a right winding direction, the outermost layer 34 is oriented at an angle in a range between about −35° and about −55° relative to the axis (Y) of the spring wire, to increase resistance to tensile stress components (see FIGS. 10B, 10D).

Moreover, the number of fiber layers, i.e. layers of fibers within a thermoplastics or thermoset resin matrix, or the quantity of fibers within the wire 12 may be selectively varied along a length of the wire; for example the number of fiber layers or the quantity of fibers within the wire 12 may be lower at the ends 40, 42 of the spring than along the length thereof in between these ends 40, 42. FIG. 11 for example shows a compression coil spring with a right winding direction, with tapered terminal ends 40, 42. Alternatively, the coil spring may have thickened ends as shown for example in FIG. 20B.

Figure 12C:
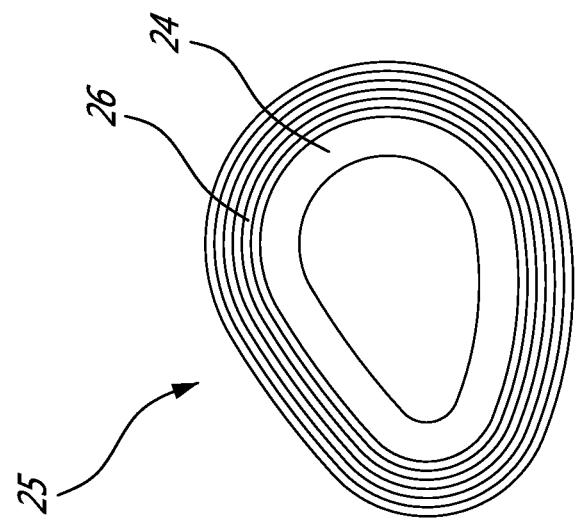
FIG. 12C shows a cross section of a potato-like preform according to embodiment of an aspect of the present disclosure.
Figure 12B:
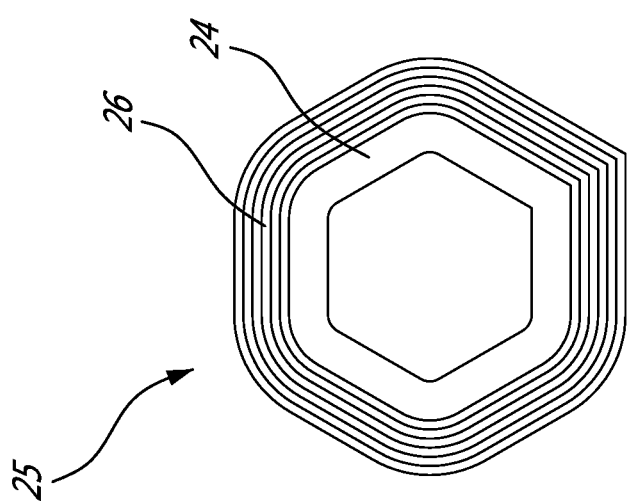
FIG. 12B shows a cross section of a prismatic preform according to embodiment of an aspect of the present disclosure.
Figure 12A:
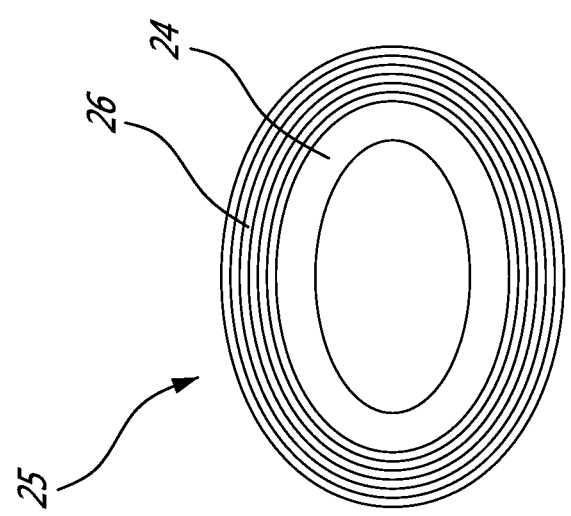
FIG. 12A shows a cross section of an ovoid preform according to embodiment of an aspect of the present disclosure.
Figure 21:
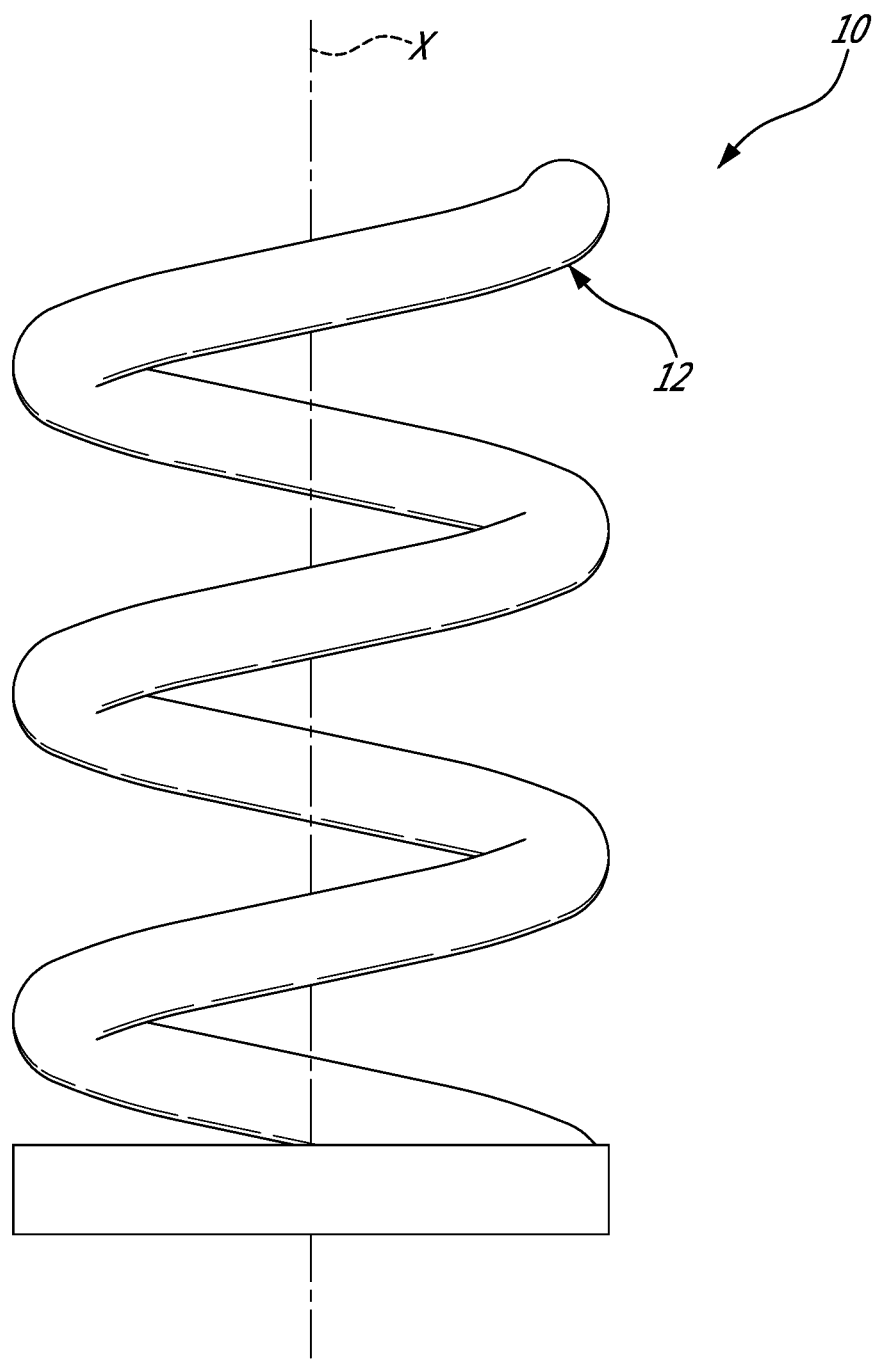
FIG. 21 shows a coil spring with a polygonal end cross section according to embodiment of an aspect of the present disclosure.

Moreover, the number of fiber layers or the quantity of fibers within the wire 12 may be selectively adjusted to tailor a cross section of the wire, which may be circular, polygonal such as square or rectangular or hexagonal for example, convex or ovoid or potato-like for example, as will be discussed hereinbelow in relation to FIG. 12. The geometry of the cross section of the spring wire may thus be selected based upon #the intended use of the spring. Thus, for example, FIG. 21 shows a wire having a polygonal cross section at an end thereof for stability of the spring, while the remaining cross section thereof is circular.

Fiber fabrics may be inserted between the layers, to yield non-axisymmetric fiber layer placement around the core, as will be discussed hereinbelow in relation to FIG. 13.

Figure 17:
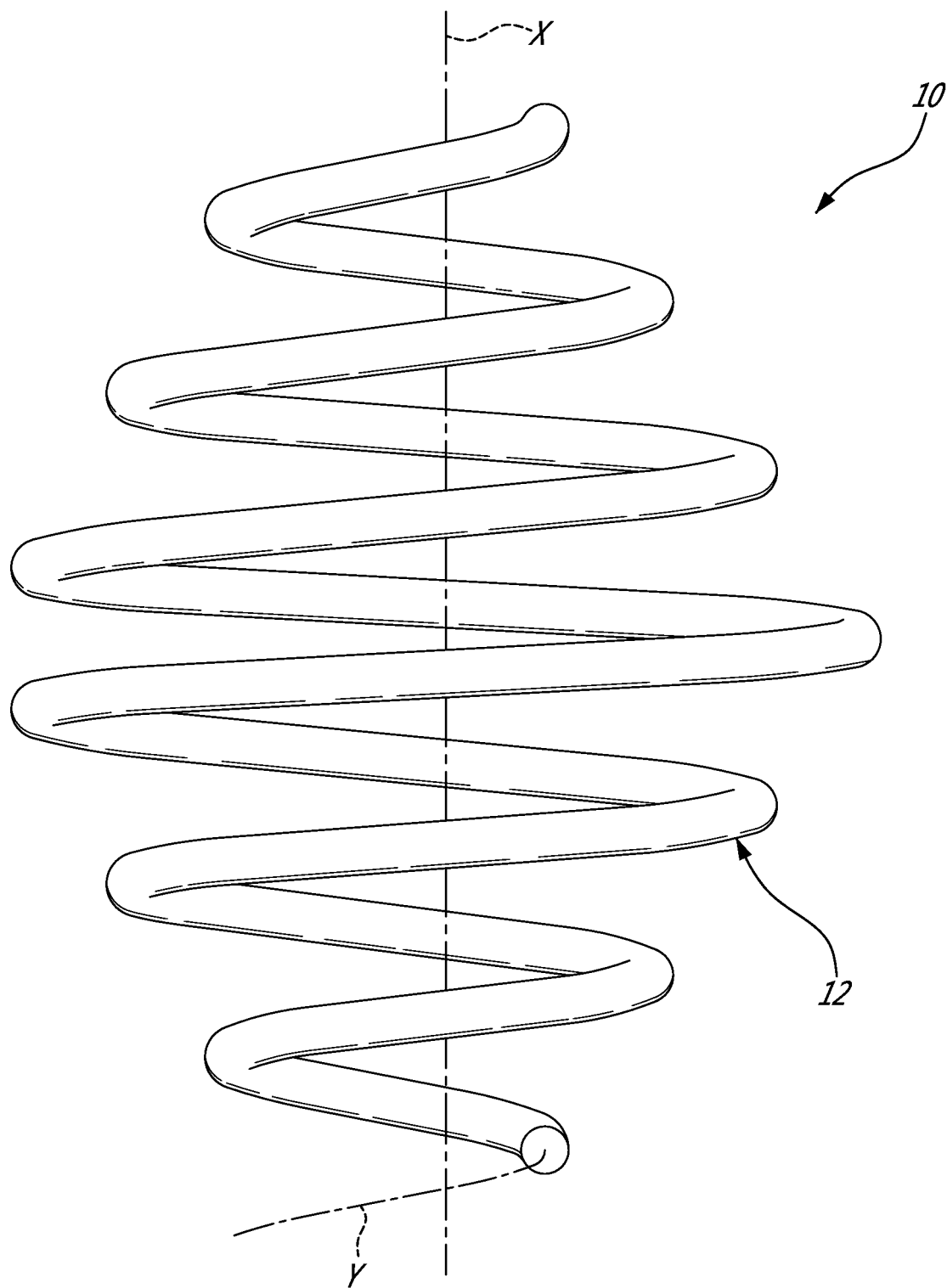
FIG. 17 shows a barrel-shaped coil spring according to embodiment of an aspect of the present disclosure.
Figure 18:
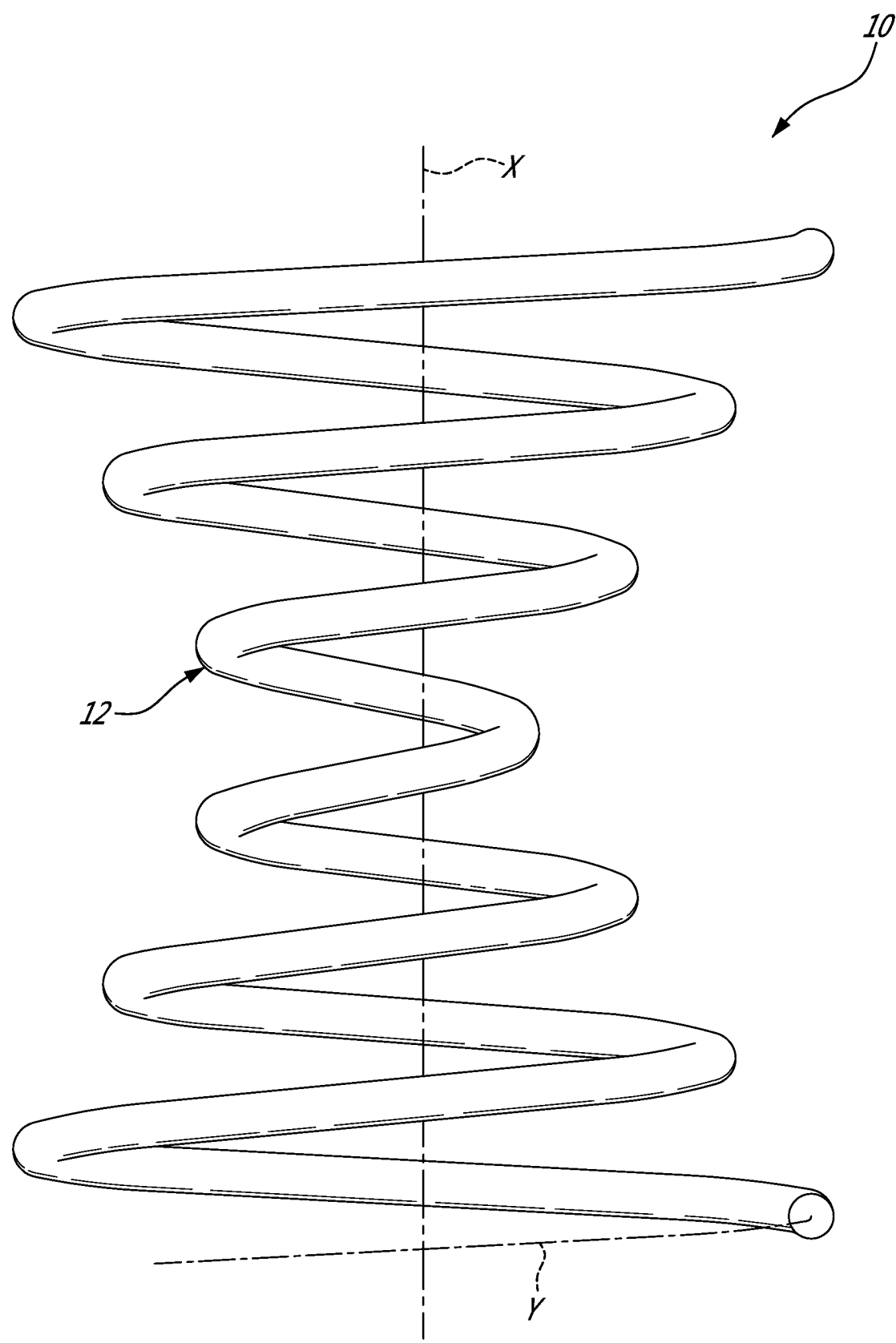
FIG. 18 shows an hourglass shape coil spring according to embodiment of an aspect of the present disclosure.

The coil spring may have a constant pitch as illustrated for example in FIG. 1, or a variable pitch as illustrated for example in FIG. 15. The coil spring may have a cylindrical shape as illustrated for example in FIGS. 1 and 15, a conical shape as illustrated for example in FIG. 16, a barrel shape as illustrated for example in FIG. 17, or an hourglass shape as illustrated for example in FIG. 18.

Figure 19:
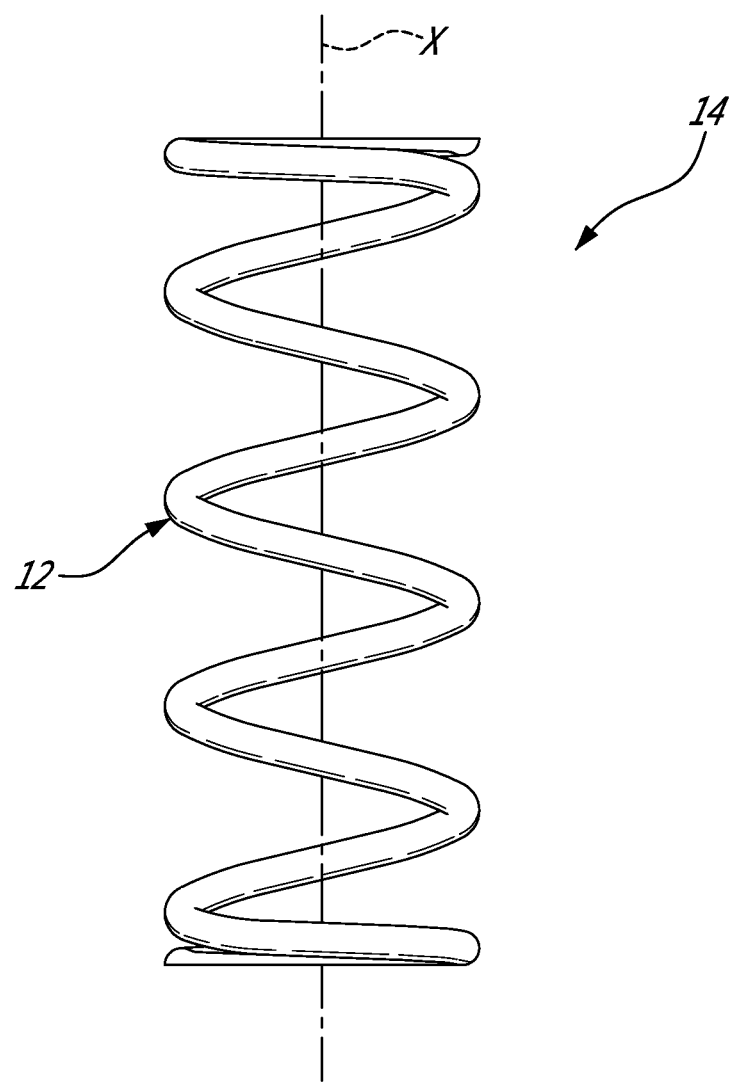
FIG. 19 shows a coil spring with ground ends according to embodiment of an aspect of the present disclosure.

The coil spring may have open ends as illustrated for example in FIG. 1 or closed ends as can be seen for example in FIG. 8, ground ends (FIG. 19) or unground ends (FIG. 1).

In a method according to an embodiment of an aspect of the present disclosure, a composite, non-axisymmetric or axisymmetric, uncured, i.e. unsolidified hence flexible, preform comprising a core and at least two fiber layers is fabricated.

Figure 14B:
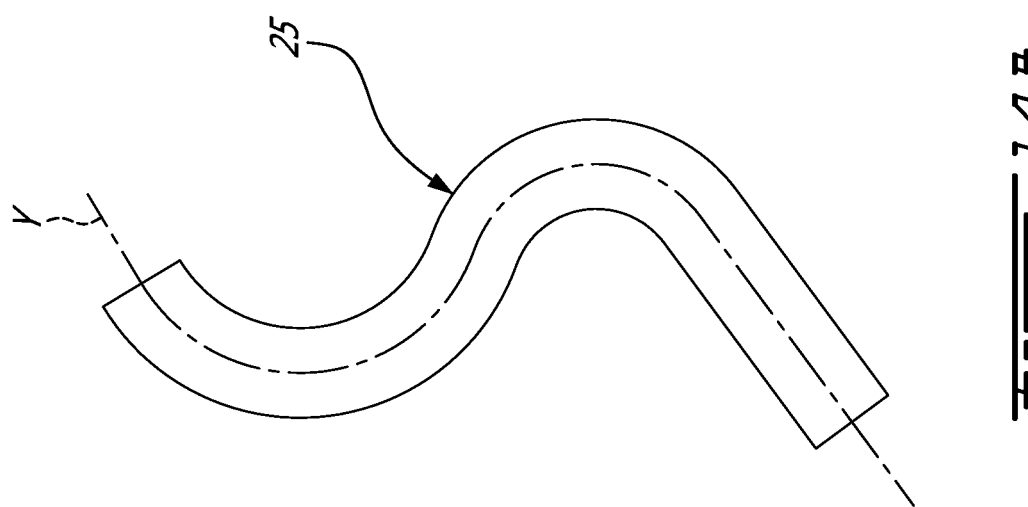
FIG. 14B is a schematic view of a non-straight uncured preform according to embodiment of an aspect of the present disclosure.
Figure 14A:
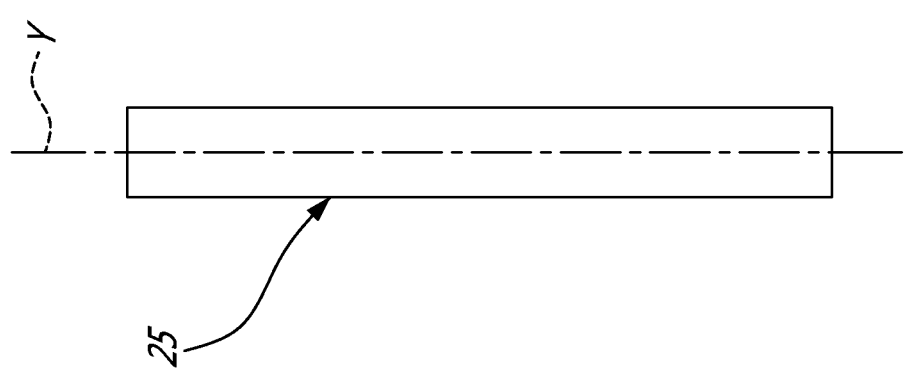
FIG. 14A is a schematic view of a straight uncured preform according to embodiment of an aspect of the present disclosure.

As schematized in FIG. 14, the uncured preform 25 may be straight (FIG. 14A) or non-straight (FIG. 14B), yet flexible. Then, during a coiling step, the uncured preform 25 is selectively oriented into a spring according to target performances of the spring. All these steps may be performed at ambient temperature.

Optionally, an external envelope of a shrinkable plastic material, such as a tubing 28 or a tape 30 as discussed hereinabove in relation to FIG. 9 for example, may be positioned around the uncured preform 25 before shaping. When manufacturing the preform, such an external envelope may insure a uniform distribution of the resin while it is still in a liquid form, as this external envelop, being impervious, contains the resin and insures a correct wetting of the previously orientated fibers before the solidification of the matrix. It can also insure a correct compression of the wetted fibers as well as insuring a correct final fiber-to-resin ratio. The external envelope may then be removable from the spring once formed, after curing. However, it may be decided to keep it in the final spring as will be discussed hereinbelow.

Figure 22:
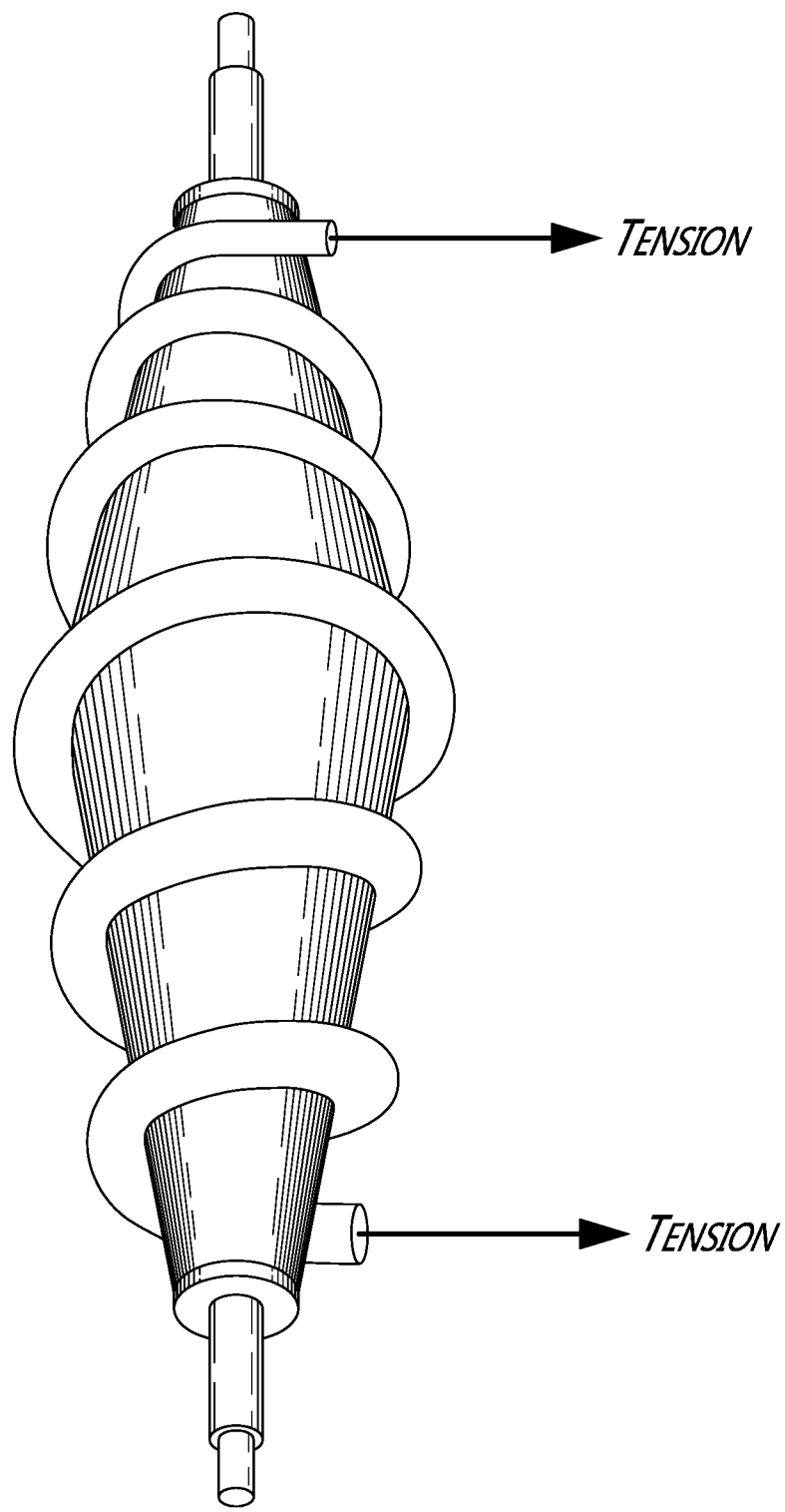
FIG. 22 shows a step in a method according to embodiment of an aspect of the present disclosure.

A non-axisymmetric geometry of the wire may be achieved by at least one of: 1) selecting a core of a non-axisymmetric cross section, 2) selecting a non-axisymmetric placement of the fiber layers about the core, 3) by selectively selecting the ratio between the fiber and the resin, and 4) by lateral displacement of the core 24 of the wound preform 25 prior to curing (see FIG. 22).

Thus, the core may be selected as an ovoid, a prismatic or a potato-like core for example.

Figure 13:
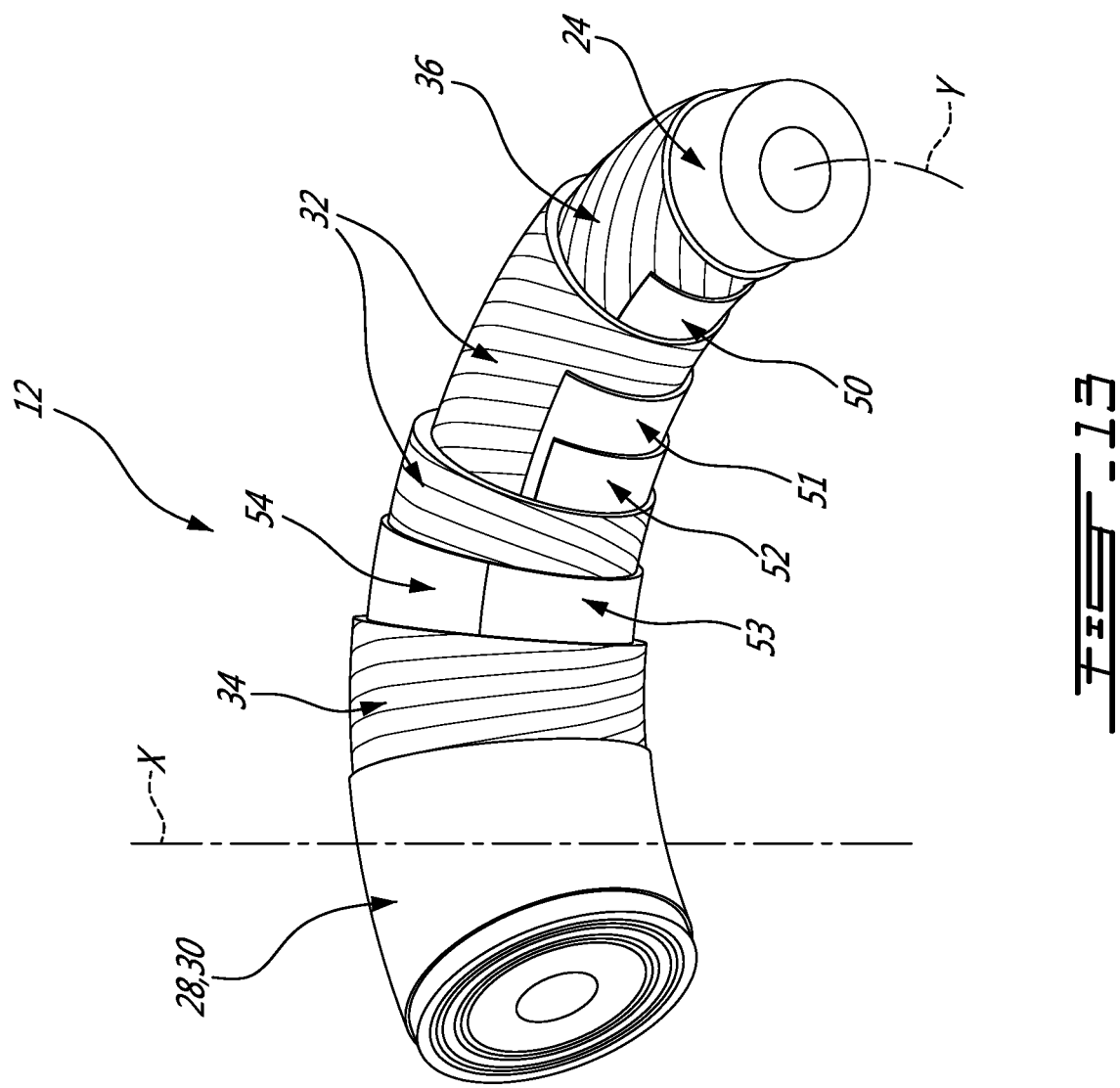
FIG. 13 is a schematic view of a wire of a compression coil spring according to embodiment of an aspect of the present disclosure.

Non-axisymmetric fiber layers placement may be achieved by inserting fiber fabrics between the layers of the preform, as shown in FIG. 13 for example. These fabrics 50, 51, 52, 53, 54 may be of different compositions: mat, cloth or unidirectional; they may be combined into a specific stacking (51, 52) of any of these types of fabrics. These inserted fabrics may be layered on only a portion of the periphery of the preform or extent over the whole circumference of the preform. A combination of different fabrics (53, 54) may be used to cover the whole periphery of the cross section of the preform to achieve different properties in different portions of the wire of the resulting spring.

The resulting preforms 25 may thus have a circular, a polygonal such as square or rectangular or hexagonal (FIG. 12B), convex or ovoid (FIG. 12A) or potato-like (FIG. 12C) cross sections, resulting into corresponding cross sections of the wire 12.

By selectively positioning different numbers of fiber layers along the length of the preform and/or by varying the ratio between resin and fiber along the length of the preform, and/or by selecting a core having a varying cross section along its length as shown in FIG. 21 for example, the preform may be fabricated to provide rigidified or more flexible lengths of the spring wire along the longitudinal axis (Y) of the spring wire, without modifying the composition of the composite material used.

As shown in FIG. 22, a further way of achieving non-axisymmetric placement of the fibers relative to the axis (Y) of the wire is to insert a cable within the hollow core 24 and then applying a tension on each end of the cable thereby deflecting the core 24 along its length towards the inner side of the wound preform while still uncured, before curing.

Figure 20A:
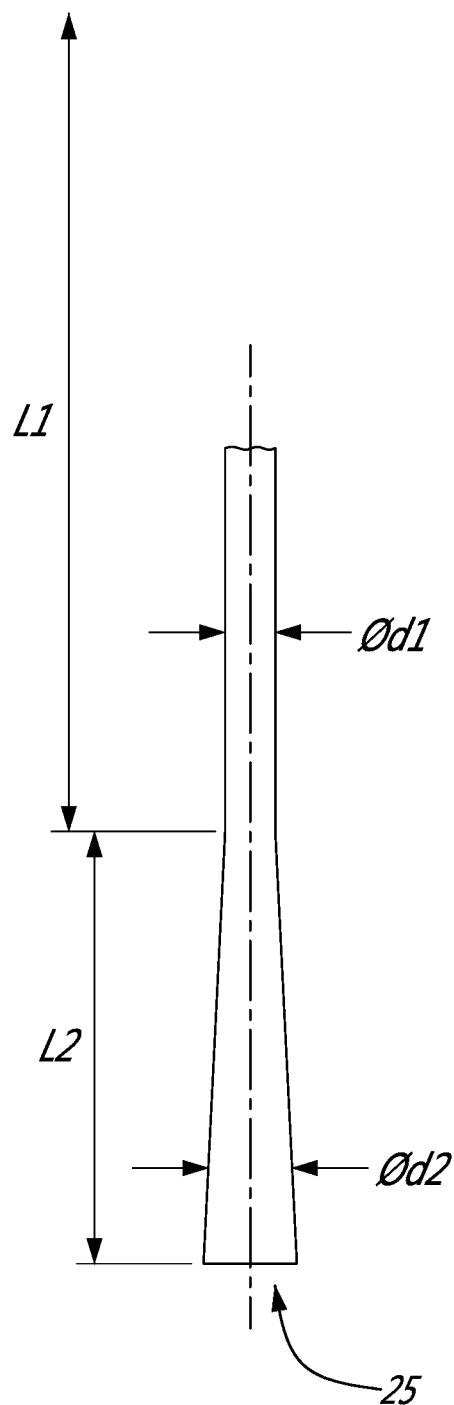
FIG. 20A is a partial view of a preform according to embodiment of an aspect of the present disclosure.
Figure 20B:
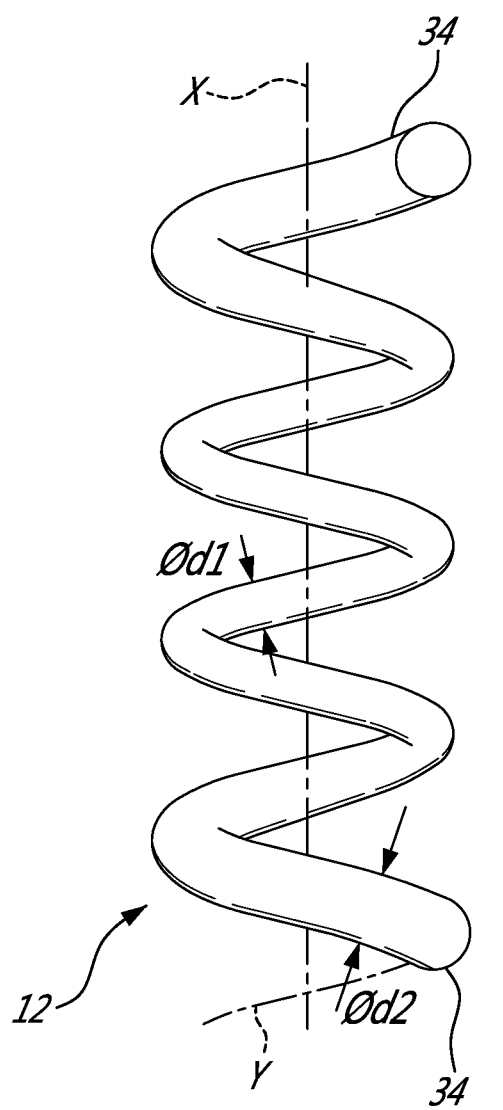
FIG. 20B shows a spring made from the preform of FIG. 20A according to embodiment of an aspect of the present disclosure.

In FIG. 20A, the preform 25 is shown with a first constant diameter $\Phi d_1$ over a length $L_1$ thereof, and an increasingly larger diameter along a length $L_2$ on each end thereof (only on end shown), until a diameter of the cross section at the ends thereof $\Phi d_2 > \Phi d_1$. The resulting spring shown in FIG. 20B thus comprises thickened ends 34, i.e. of a diameter $\Phi d_2$ larger than the diameter $\Phi d_1$ along the remaining part of its length. Such a thickening of the ends of the spring wire 12 allows precompression of the spring while minimizing contact between terminal coils of the spring, which might otherwise induce mechanical damages thereto. Providing a transition length $L_2$ of increasing diameter from $\Phi d_1$ to $\Phi d_2$ prevents concentration of stresses. The resulting spring is then characterized by a linearly varying spring constant, without dead coils and resistant to mechanical stresses submitted locally.

The preform may be fabricated with a linearly varying diameter of its cross section, with tapered extremities for example, so that the resulting spring has tapered ends (see for example FIG. 11), thereby suppressing a grinding step as typically done on the art.

Thus, independently of the winding direction during the coiling step, the cross section of the wire of the resulting spring may be variable according to the position along the length of the spring.

Figure 23:
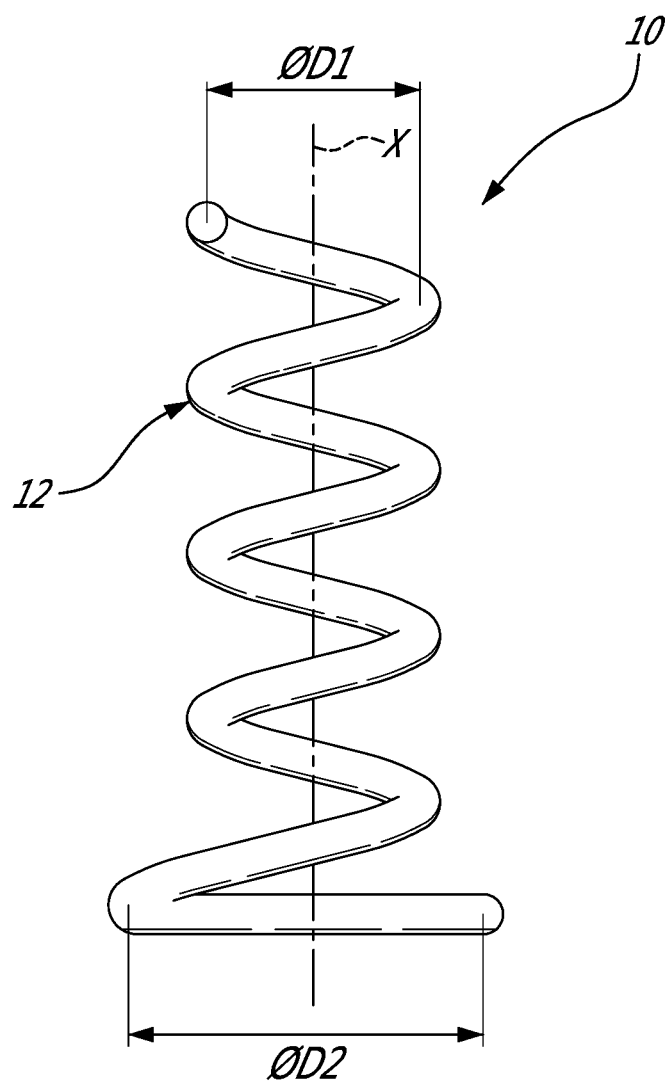
FIG. 23 shows an hourglass-shape spring comprising a last coil of a diameter $\Phi D_2$ greater than a mean spring diameter $\Phi D_1$, according to embodiment of an aspect of the present disclosure.

FIG. 23 shows an hourglass-shape compression spring comprising a last coil of a diameter $\Phi D_2$ greater than the mean spring diameter $\Phi D_1$, thereby providing an increased contact surface, which eliminates dead coils or the use of a compensation plate for stability, as typically done in the art.

Figure 24:
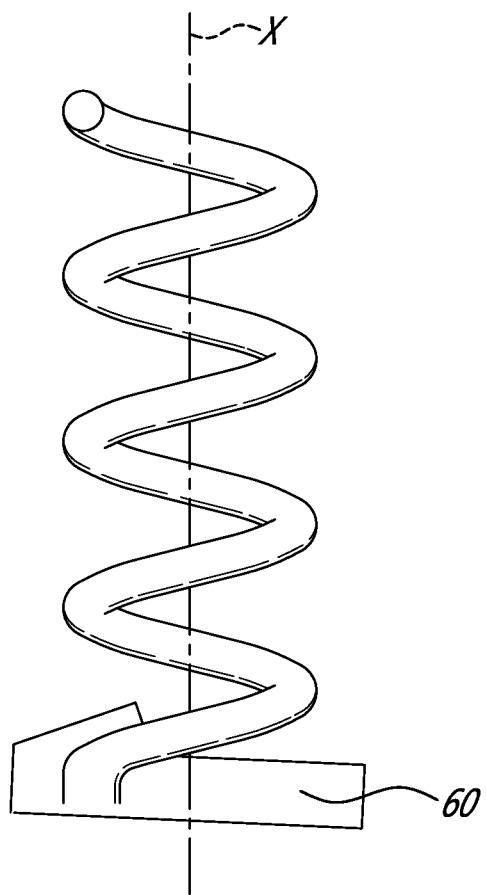
FIG. 24 shows a cylindrical coil spring having an end coil of a plate geometry according to an embodiment of an aspect of the present disclosure.

FIG. 24 shows another embodiment comprising forming the helicoidal section and then overmolding a plate geometry 60 of a selected diameter and thickness at the end coils, thereby ensuring that all coils of the spring are operational. Such overmolding of the end coils may be done directly on the wound preform using a bulk molding compound (BMC) such as a polyester/fiber compound by pressure die-casting for example (see FIG. 25)

There is thus provided a composite coil spring fabricated using a straight or non-straight uncured preform, by forming the uncured preform into a coil spring shape.

Depending on the desired spring mean diameter and the external diameter of the preform, the helical forming during the coiling step involves a curvature, i.e. a length difference between the inner and outer sides of the spring, which determines the effective angle at which the fibers are positioned in the resulting spring once the shaping is complete. The angle placement of the fibers used for the realization of the straight preform is thus selected according to the mean diameter of the spring, as well as the position from the center of the preform and the desired angle on the inner side of the spring, where stresses are maximal. Furthermore, for a variable mean diameter spring, i.e. conical, hourglass or barrel geometry for example, the angle placement of the fibers of the preform may be modified along its length considering the final geometry, aiming for an optimal fibers orientation on the inner side of the spring for the whole spring.

The core 24 may be a flexible plastic tube in which conductive elements such as metallic filaments, including coated fibers for example, or twisted wires are integrated, i.e. encapsulated, thereby allowing the use of an electrical source to generate the heat required to cure the thermoset resin matrix such as by resistance and induction heating. Alternatively, the outermost layer of the preform may comprise electrical conductive elements such as fibers or filaments to allow curing the resin matrix and thus the solidification of the preform. Solidification may also be achieved through other methods such as through microwave or radiation heating. The flexible tube can be removed after curing, yielding an inner cavity in the cross section of the resulting spring and thus a reduced weight of the spring.

Alternatively, the inner cavity of the core 24 may be used to add selected characteristics to the spring by housing a functional element. For instance, it may be filled with a viscoelastic or a thixotropic material allowing for a damping effect. Optic fibers, sensor gauges or thin wire cables may be inserted as sensors for mechanical properties based on inductive effect, deflection, deformations for example.

Alternatively, the core 24 may be made of metallic wires in a twisted form, in the way of a steel cable for example. By selecting the twisting direction of the metallic wires, the core 24 may be formed with an undulated surface that may improve the adherence with the wounded reinforcing fibers of the preform and yield an increased better overall strength of the coil spring.

As mentioned hereinabove, the wire may be provided with an external envelope such as a heat-shrink tube 28 or wrapped in a shrink tape 30 or a coextruded flexible thermoplastic sheath or covered by a sprayed plastic film.

Such an external envelope may protect the spring from damages caused by the impacts and wear from projections of rocks, mud, sand or any other debris, to which suspension springs, for instance, are typically exposed, in on-road vehicles, such as cars and trucks, and in off-road vehicles, such as motorcycles, ATVs and snowmobiles for example. Furthermore, the external envelope may protect the spring from stresses due to weather conditions such as rain, or prolonged exposition to humidity or sunlight, or to any chemicals prone to be in contact with the spring in use, such as for example de-icing salts, sea water, etc. The external envelope may also be selected as a colored or luminescent sheath, or as a layer incorporating patterns, drawings, logos or the like, as a substitute for traditional finishing processes such as painting, labelling or decals application. The external envelope may also be selected as a layer providing surface finish (roughness), embossment or texturing for example.

Still alternatively, the external envelope may be selected as a transparent sheath, thereby letting the rough resin color show. This color may be modified by adding colored or luminescent pigment to the resin.

There is thus provided a composite helical spring designed for compressive force, with either a constant pitch or a variable pitch, in a range of shapes such as conical, barrel, hourglass forms etc., a range of wire cross sections, and a range of ends type, i.e. open ends, closed ends, tapered ends, thickened ends, ground, unground ends.

The present composite coil springs may be used in vehicle suspensions systems such as automotive suspensions, snowmobiles suspensions, off-road vehicles suspensions and recreational vehicles suspensions for example.

There is provided a method for fabrication of a composite coil spring, generally comprising fabricating a preform, forming the preform into a coil spring shape and then solidifying it by using a heating source.

As an example, two identical preforms having a same core, same inner layers at same angular positioning of fibers relative to the axis (Y), same amount of fibers and fiber-to-resin ratio were fabricated. Both preforms were coiled with a same number of turns around an axis (X) to yield a same spring mean diameter (ΦD), a same cross section diameter (d) and a same free height (h). The difference was the angular positions of the outermost layer, which were opposite. Both springs were tested under compression until they broke. Table 1 below shows the measured results.

TABLE 1

| | Deflection (mm) at break | Load (N) at break | (0.5 * Load * Deflection)/weight |
|---|---|---|---|
| Spring A - Left (right) winding with layer 34 oriented at −45° (+45°) relative to the axis (Y) of the spring wire | 111 | 2287 | 0.42 |
| Spring B - Left (right) winding layer 34 oriented at +45° (−45°) relative to the axis (Y) of the spring wire | 126 | 2602 | 0.56 |

Table 1 records the deflection of the springs when the springs broke, the corresponding load at break and, in the third column, an estimation of the energy stored. It appears that for a given winding direction of the coil spring, there is a preferential orientation of the outermost later as more energy can be stored in Spring B compared to Spring A.

There is thus provided a method comprising selectively fabricating a preform and combining the winding direction given to a coil spring, the direction of stress when the spring is compressed, and the anisotropic properties of the composite material of the spring wire, according to a target compression spring and optimized stored and restored in energy by the compression spring per unit mass.

The scope of the claims should not be limited by the illustrative embodiments set forth in the examples, but should be given the broadest interpretation consistent with the description as a whole.

The invention claimed is:

1. A composite spring made of a wire having a longitudinal axis and curved around a spring axis in a winding direction, wherein said wire comprises:
a core; and
fiber layers wound around said core;
wherein said fiber layers comprise innermost fibers closest to said core, outermost fibers and intermediate fibers between said innermost fibers and said outermost fibers, an orientation of said outermost fibers relative to the longitudinal axis of the wire being selected, for a given winding direction of the spring, along a length of said core, according to a target energy stored by the spring in compression per unit mass,
the orientation of the outermost fibers being a negative angle relative to the longitudinal axis for the given winding direction of the spring being a right winding direction, and
the orientation of the outermost fibers being a positive angle relative to the longitudinal axis for the given winding direction of the spring being a left winding direction.

2. The composite spring of claim 1, wherein, i) in the right winding direction of the wire about the spring axis, the outermost fibers are oriented at an angle in a range between −35° and −55° relative to the longitudinal axis of the wire, and ii) in the left winding direction of the spring, the outermost fibers are oriented at an angle in a range between +35° and +55 relative to the longitudinal axis of the wire.

3. The composite spring of claim 1, of the left winding direction, wherein:
the outermost fibers are oriented at an angle in a range between +35° and +55 relative to the longitudinal axis of the wire; and
the innermost fibers are oriented, relative to the longitudinal axis of the wire, at an angle in a range between about 0° and about 15°.

4. The composite spring of claim 1, of the left winding direction, wherein:
the outermost fibers are oriented at an angle in a range between +35° and +55 relative to the longitudinal axis of the wire;
the innermost fibers are oriented, relative to the longitudinal axis of the wire, at at least one of: i) an angle in a range between about 0° and about 15°; ii) an angle in a range between +75° and +90°; iii) an angle in a range between 0° and about −15°; and iv) an angle in a range between −75° and about −90°; and
the intermediate fibers are oriented at an angle in a range selected between: i)+35° and +55° and ii) −35° and −55° relative to the longitudinal axis of the wire.

5. The composite spring of claim 1, of the right winding direction of the wire about the spring axis, wherein:
the outermost fibers are oriented at an angle in a range between −35° and −55° relative to the longitudinal axis of the wire; and
the innermost fibers are oriented, relative to the longitudinal axis of the wire, at an angle in a range between about 0° and about +15°.

6. The composite spring of claim 1, of the right winding direction of the wire about the spring axis, wherein:
the outermost fibers are oriented at an angle in a range between −35° and −55° relative to the longitudinal axis of the wire; and
the innermost fibers are oriented, relative to the longitudinal axis of the wire, at at least one of: i) an angle in a range between about 0° and about +15°; ii) an angle in a range between +75° and +90°; iii) an angle in a range between 0° and about −15°; and iv) an angle in a range between −75° and about −90°; and
the intermediate fibers are oriented at an angle in a range selected between: i)+35° and +55° and ii) −35° and −55° relative to the longitudinal axis of the wire.

7. The composite spring of claim 1, wherein said wire comprises at least one of: a circular cross section along at least a part of a length thereof, a polygonal cross section along at least a part of the length thereof, a convex cross section along at least a part of the length thereof; an ovoid cross section along at least a part of the length thereof; tapered ends, thickened ends, ground ends, unground ends, polygonal cross-shaped ends; and overmolded ends.

8. The composite spring of claim 1, wherein said wire is wound into a spring coil of at least one of: a constant pitch, a variable pitch, a cylindrical shape, a conical shape, a barrel shape; an hourglass shape, an open ends spring and a closed ends spring.

9. The composite spring of claim 1, wherein said core is one of: i) a hollow tube; ii) a hollow tube comprising at least one thermal or electrical conductive element running through said hollow tube; and iii) a hollow core housing a functional element.

10. The composite spring of claim 1, wherein said wire comprises an external envelope.

11. The composite spring of claim 1, wherein said core is one of; i) a core having a constant cross section along the length thereof, and ii) a core having a varying cross section along the length thereof; and at least one of: i) a number of the fiber layers and ii) fiber-to-resin ratio is selectively varied along the length of the wire.

12. The composite spring of claim 1, wherein, in the right winding direction of the wire about the spring axis, a number of fiber layers oriented at −θ° relative to the longitudinal axis of the wire is greater than or equal to a number of fiber layers oriented at +θ° relative to the longitudinal axis of the wire; and in the left winding direction, a number of fiber layers oriented at +θ° relative to the longitudinal axis of the wire is greater than or equal to a number of fiber layers oriented at −θ° relative to the longitudinal axis of the wire.

13. A method for fabricating a composite spring of a given winding direction along a spring axis thereof, comprising:
A) fabricating a composite uncured preform comprising a core and at least one innermost fiber closest to the core, outermost fibers and intermediate fibers wound between the at least one innermost fiber and the outermost fibers;
B) selecting, depending on the given winding direction of the spring, an orientation of the outermost fibers relative to a longitudinal axis of the preform along a length of said preform, according to a target energy stored by the spring in compression per unit mass,
the orientation of the outermost fibers being a negative angle relative to the longitudinal axis for the given winding direction of the spring being a right winding direction, and
the orientation of the outermost fibers being a positive angle relative to the longitudinal axis for the given winding direction of the spring being a left winding direction;
C) shaping the uncured preform relative to the spring axis into the spring of the given winding direction; and
D) curing.

14. The method of claim 13, comprising providing a non-axisymmetric placement of said innermost, outermost and intermediate fibers relative to the longitudinal axis of the preform by at least one of: i) selecting a core of a non-axisymmetric cross section, ii) selecting a non-axisymmetric placement of the innermost, outermost and intermediate fibers about the core, iii) selecting a fiber-to-resin ratio, and iv) causing a lateral displacement of the core of the uncured preform.

15. The method of claim 13, comprising at least one of: i) selectively positioning the innermost, outermost and intermediate fibers along the length of the preform, ii) varying a fiber-to-resin ratio along the length of the preform, and iii) selecting the core to have a varying cross section along a length thereof.

16. The method of claim 13, wherein said shaping the uncured preform into the spring of the given winding direction comprises winding the preform in the given winding direction around the spring axis, with at least one of: a constant pitch, a variable pitch, a cylindrical shape, a conical shape, a barrel shape, an hourglass shape, an open ends spring and a closed ends spring.

17. The method of claim 13, comprising adjusting at least one of: A) a high natural frequency of the spring by orienting the at least one innermost fiber at an angle in a range selected between: i)+75° and +90° and ii) −75° and −90°, relative to the longitudinal axis of the preform; and B) a resistance to buckling of the spring by orienting the at least one innermost fiber at an angle in a range selected between: i) 0° and +15° and ii) 0° and −15°, relative to the longitudinal axis of the preform.

18. The method of claim 13, comprising orienting the intermediate fibers at an angle in a range selected between: i)+35° and +55° and ii) −35° and −55°, relative to the longitudinal axis of the preform.

19. The method of claim 13, comprising, i) for the right winding direction of the spring about the spring axis, orienting the outermost fibers at an angle in a range between −35° and −55° relative to the longitudinal axis of the preform; and ii) for the left winding direction, orienting the at least one outermost fibers at an angle in a range between +35° and +55° relative to the longitudinal axis of the preform.

20. The method of claim 13, comprising selecting:
i) for the right winding direction of the spring about the spring axis, a number of fiber layers oriented at −θ° relative to the longitudinal axis of the preform is greater than or equal to a number of fiber layers oriented at +θ° relative to the longitudinal axis of the preform; and
ii) for the left winding direction of the spring about the spring axis, a number of fiber layers oriented at +θ° relative to the longitudinal axis of the preform is greater than or equal to the number of fiber layers oriented at −θ° relative to the longitudinal axis of the preform.

* * * * *